(12) United States Patent
Nakamura

(10) Patent No.: US 9,025,170 B2
(45) Date of Patent: May 5, 2015

(54) INSPECTION APPARATUS AND INSPECTION METHOD TO DETERMINE A PRINTED MATERIAL DEFECT PORTION BASED ON A DENSITY DIFFERENCE OF IMAGE DATA

(71) Applicant: Canon Kabushiki Kaisha, Toyko (JP)

(72) Inventor: Yasuyuki Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/869,499

(22) Filed: Apr. 24, 2013

(65) Prior Publication Data

US 2013/0301067 A1 Nov. 14, 2013

(30) Foreign Application Priority Data

May 10, 2012 (JP) ................. 2012-108823

(51) Int. Cl.
*H04N 1/40* (2006.01)
*G06K 15/00* (2006.01)
*G06K 9/00* (2006.01)
*G03F 3/08* (2006.01)
*H04N 1/00* (2006.01)
*G06T 7/00* (2006.01)
*H04N 1/409* (2006.01)

(52) U.S. Cl.
CPC .......... *H04N 1/00037* (2013.01); *G06T 7/0004* (2013.01); *H04N 1/00005* (2013.01); *H04N 1/00015* (2013.01); *H04N 1/0005* (2013.01); *H04N 1/00082* (2013.01); *G06T 2207/10024* (2013.01); *G06T 2207/30144* (2013.01); *H04N 1/4095* (2013.01)

(58) Field of Classification Search
None
See application file for complete search history.

(56) References Cited

U.S. PATENT DOCUMENTS

2011/0075233 A1 * 3/2011 Oosaki ..................... 358/505

FOREIGN PATENT DOCUMENTS

JP 2009-078457 A 4/2009

* cited by examiner

*Primary Examiner* — Eric A Rust
*Assistant Examiner* — Haris Sabah
(74) *Attorney, Agent, or Firm* — Fitzpatrick, Cella, Harper & Scinto

(57) ABSTRACT

A reading unit reads a first side of a printed material having first image data printed on the first side and second image data printed on a second side, the second side being a back side of the first side, in order to obtain image data. A density determination unit determines whether a density of the second image data exceeds a predetermined density. A comparison unit compares a density of the image data obtained by the reading unit and a density of the first image data, and produces a comparison result. A determination unit, in a case when a density difference between the density of the image data and the density of the first image data exceeds a threshold as the comparison result of the comparison unit, determines that the printed material includes a defect portion.

22 Claims, 22 Drawing Sheets

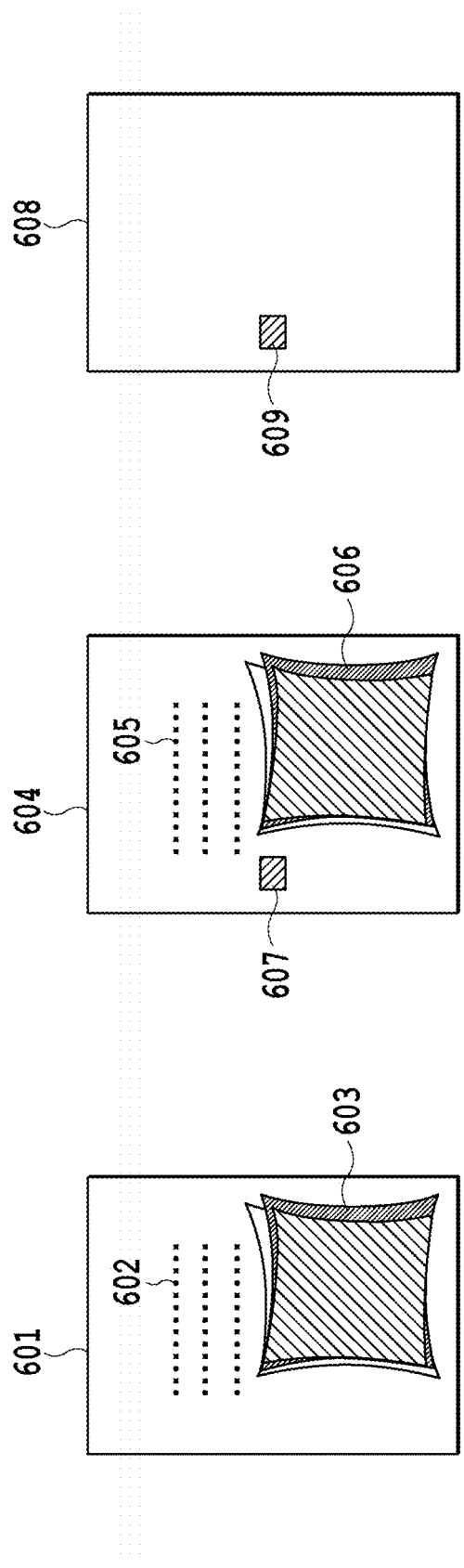

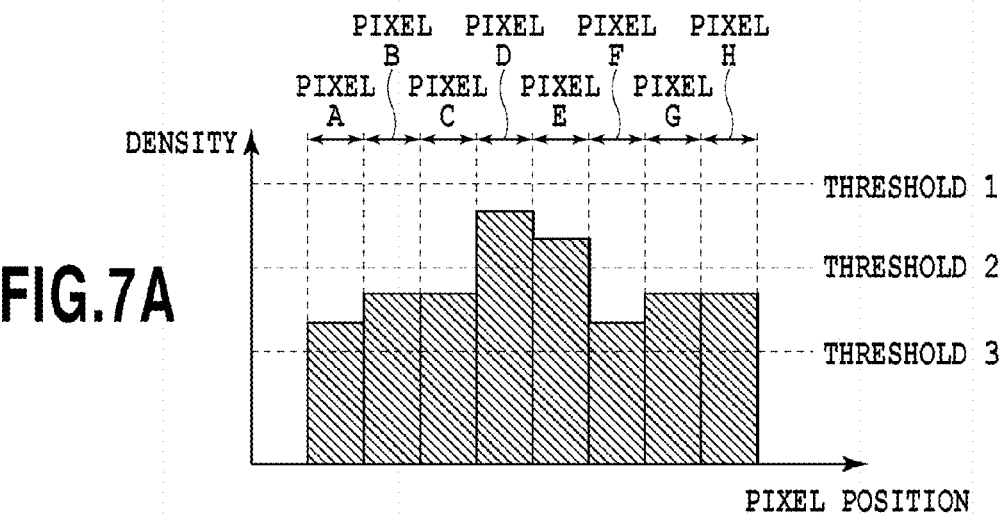

FIG.9A

| | | | | |
|---|---|---|---|---|
| 0 | 0 | 0 | 0 | 0 |
| 1 | 1 | 1 | 0 | 0 |
| 1 | 1 | 1 | 0 | 0 |
| 0 | 0 | 0 | 0 | 0 |
| 0 | 0 | 0 | 0 | 0 |

- 0: SHOW-THROUGH FLAG 0
- 1: SHOW-THROUGH FLAG 1

FIG.9B

| | | | | |
|---|---|---|---|---|
| 0 | 1 | 1 | 1 | 1 |
| 0 | 1 | 1 | 1 | 1 |
| 0 | 1 | 1 | 1 | 1 |
| 0 | 0 | 0 | 0 | 0 |
| 0 | 0 | 0 | 0 | 0 |

- 0: SHOW-THROUGH FLAG 0
- 1: SHOW-THROUGH FLAG 1

FIG.9C (area 901 hatched)

- 0: SHOW-THROUGH FLAG 0
- 1: SHOW-THROUGH FLAG 1
- hatched: SHOW-THROUGH AREA

FIG.9D (area 902 hatched)

- 0: SHOW-THROUGH FLAG 0
- 1: SHOW-THROUGH FLAG 1
- hatched: SHOW-THROUGH AREA

| SURFACE PROPERTY | BASIS WEIGHT | | |
| --- | --- | --- | --- |
| | THIN PAPER | REGULAR PAPER | THICK PAPER |
| FINE PAPER | 100 | 150 | 200 |
| RECYCLED PAPER | 90 | 140 | 180 |
| COATED PAPER | 110 | 170 | 220 |

FIG.11

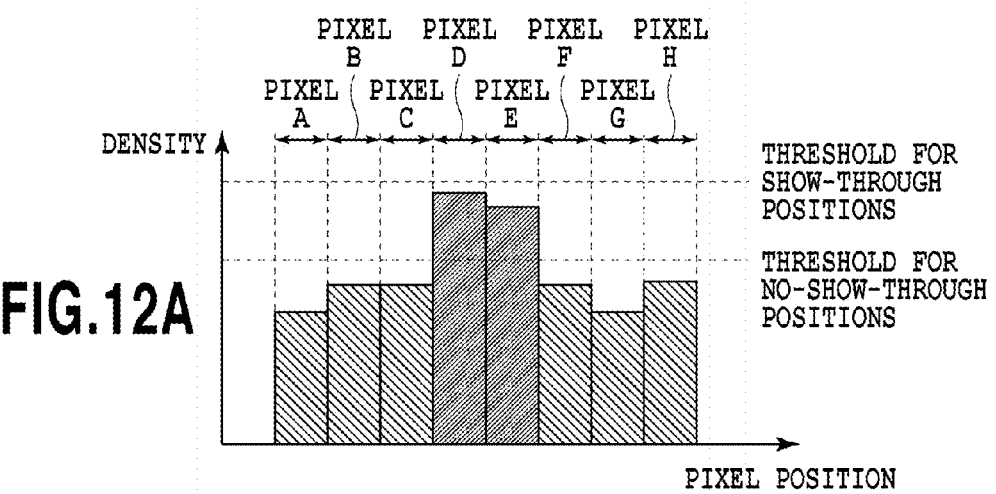

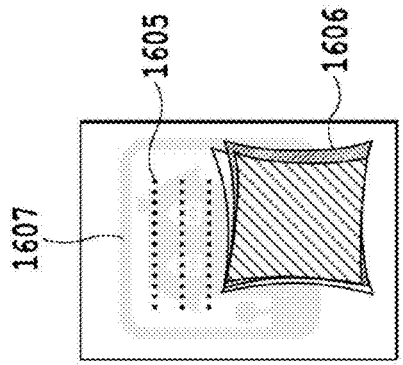
FIG.16B
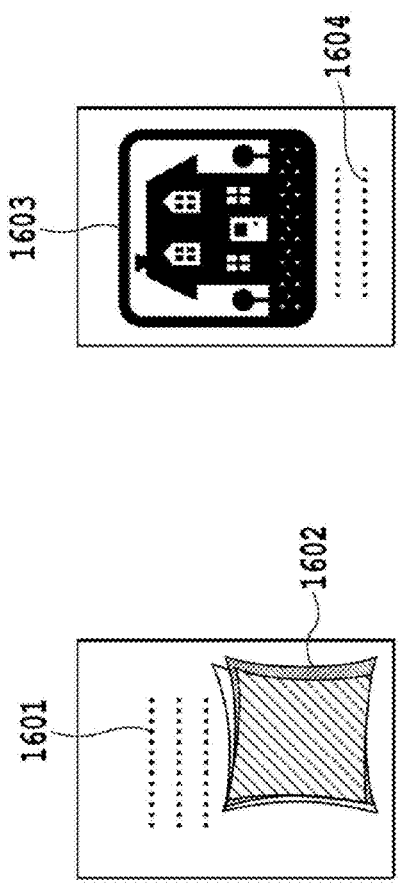
FIG.16A
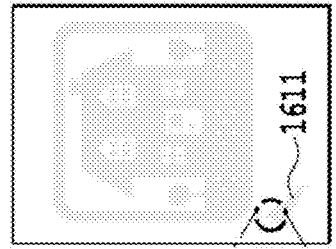
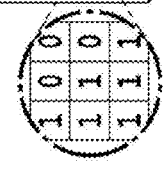
FIG.16E
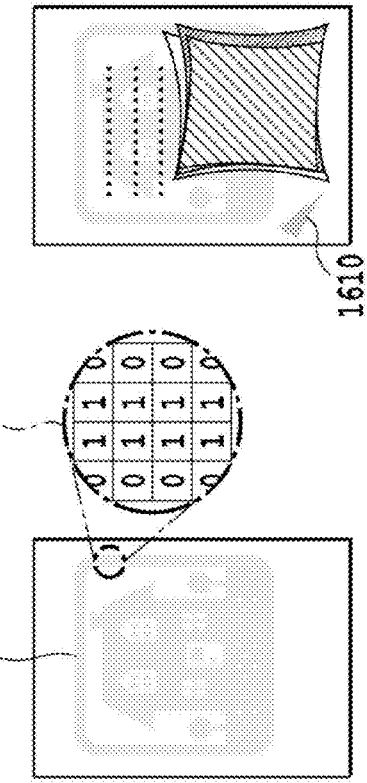
FIG.16D

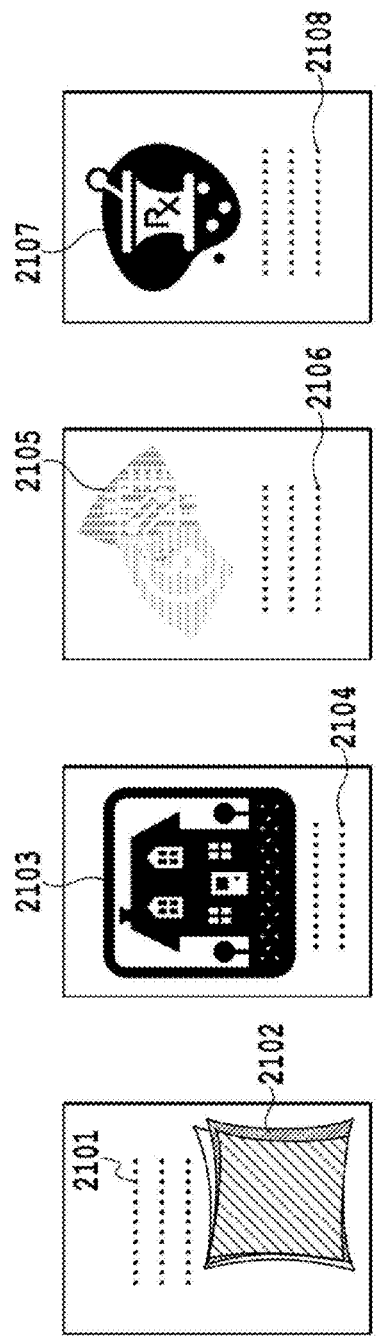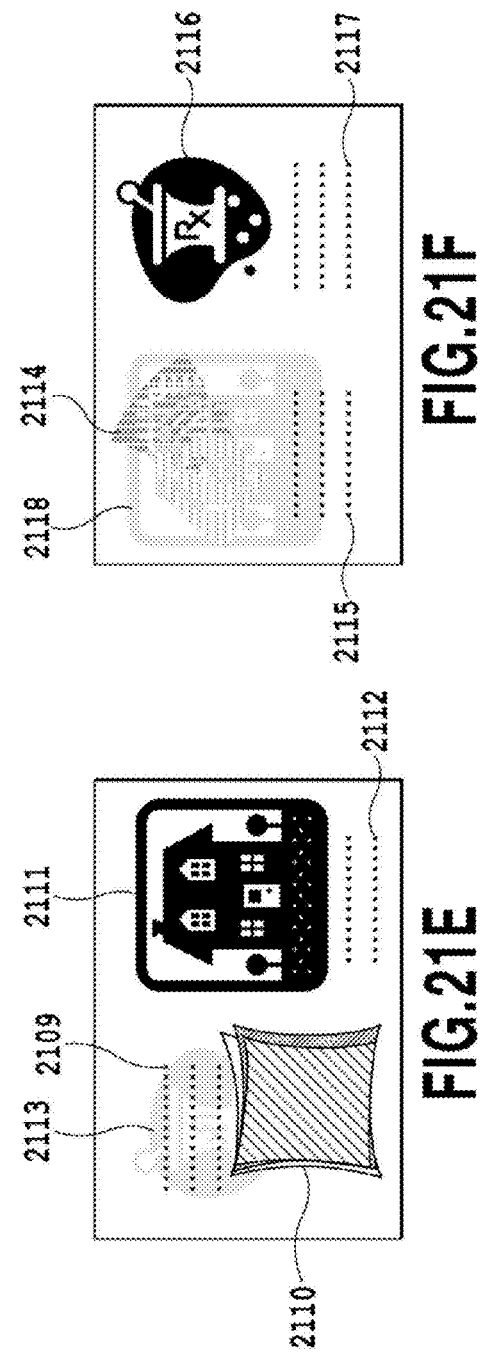

INSPECTION APPARATUS AND INSPECTION METHOD TO DETERMINE A PRINTED MATERIAL DEFECT PORTION BASED ON A DENSITY DIFFERENCE OF IMAGE DATA

CLAIM OF PRIORITY

This application claims the benefit of Japanese Patent Application No. 2012-108823, filed May 10, 2012, which is hereby incorporated by reference herein in its entirety.

BACKGROUND OF THE INVENTION

1. Field of the Invention

The present invention relates to an image forming apparatus for performing image processing on image data and printing out the processed image data on a sheet, and, more particularly, to an inspection apparatus and an inspection method for reading an image printed on a sheet and determining whether the image has a predetermined print quality.

2. Description of the Related Art

Conventional printing and binding systems, such as print on demand (POD) machines, are provided with a mechanism for determining whether an image formed on a sheet after printing has a desired quality. Systems equipped with such a mechanism are called inspection systems, and include offline inspection systems and inline inspection systems as embodiments thereof. The offline inspection system is configured to form image data on a sheet, output the sheet to the outside of an image forming apparatus, and then pass the sheet through an image quality inspection device apart from the apparatus. On the other hand, the inline inspection system is configured to read image data formed on a sheet by an image forming apparatus by using an inspection sensor included in the apparatus and to compare the read image data with image data to be printed (input image data) for inspection. For instance, a density difference between the input image data and the image data read by the inspection sensor is calculated. Then, an area having a density difference that is equal to or greater than a threshold determined according to attributes of a recording medium, such as a type or thickness thereof, is specified as an error area (see Japanese Patent Laid-open No. 2009-78457).

In inspection processing (inspection determination), however, it is difficult to increase the performance of the inspection system even by using the density difference between the input image data and the image data read by the inspection sensor for the purpose of reducing an influence of show-through on an inspected product. This is because it is impossible to determine whether the generated density difference is a density difference depending on show-through or a density difference depending on a print defect included in the image formed on a sheet in printing. While high speed printing is available in most of the printing and binding systems, such as POD machines, the inspection processing under the influence of show-through may cause a significant decrease in system productivity due to the frequent occurrence of inspection errors. Further, various types of paper are used in the printing and binding systems, and accordingly, degrees of show-through vary widely. Setting a lower standard for inspection processing for the purpose of reducing the influence of show-through for every paper type may degrade inspection accuracy in inspecting images including print defects.

SUMMARY OF THE INVENTION

An inspection apparatus of the present invention comprises a reading unit configured to read a first side of a printed material having first image data printed on the first side and second image data printed on a second side, the second side being a back side of the first side, a density determination unit configured to determine whether a density of the second image data exceeds a predetermined density, and a determination unit configured to determine whether or not the printed material is no-good (NG) by comparing, in a case when it is determined that the density of the second image data exceeds the predetermined density, a density difference between image data obtained by the reading unit and the first image data with a threshold determined based on the density of the first image data and the density of the second image data, and comparing, in a case when it is determined that the density of the second image data does not exceed the predetermined density, a density difference between the image data obtained by the reading unit and the first image data with a predetermined threshold.

In accordance with the present invention, it is possible to provide an inspection apparatus and an inspection method in which a no-good (NG) inspection determination result is not given for a portion affected by show-through, while an NG inspection determination result is given for a print defect portion.

Further features of the present invention will become apparent from the following description of exemplary embodiments (with reference to the attached drawings).

BRIEF DESCRIPTION OF THE DRAWINGS

FIG. 6A illustrates determination processing in inspection processing;

FIG. 6B illustrates determination processing in inspection processing;

FIG. 6C illustrates determination processing in inspection processing;

FIG. 7A illustrates differences in determination results in a case of using multiple inspection standards;

FIG. 7B illustrates differences in determination results in a case of using multiple inspection standards;

FIG. 7C illustrates differences in determination results in a case of using multiple inspection standards;

FIG. 7D illustrates differences in determination results in a case of using multiple inspection standards;

FIG. 9A is a block diagram of a density map in a case of applying a threshold on the basis of thin paper;

FIG. 9B is a block diagram of a density map in a case of applying a threshold on the basis of thin paper;

FIG. 9C is a block diagram of a density map in a case of applying a threshold on the basis of thin paper;

FIG. 9D is a block diagram of a density map in a case of applying a threshold on the basis of thin paper;

FIG. 11 is a table for managing a threshold in accordance with a surface property and a basis weight;

FIG. 12A shows a correlation between a threshold applied outside a show-through area and determination results;

FIG. 12B shows a correlation between a threshold applied outside a show-through area and determination results;

FIG. 12C shows a correlation between a threshold applied outside a show-through area and determination results;

FIG. 16A is a conceptual diagram illustrating a second embodiment;

FIG. 16B is a conceptual diagram illustrating the second embodiment;

FIG. 16C is a conceptual diagram illustrating the second embodiment;

FIG. 16D is a conceptual diagram illustrating the second embodiment;

FIG. 16E is a conceptual diagram illustrating the second embodiment;

FIG. 16F is a conceptual diagram illustrating the second embodiment;

FIG. 21A shows an influence of show-through in two-up, duplex printing;

FIG. 21B shows an influence of show-through in two-up, duplex printing;

FIG. 21C shows an influence of show-through in two-up, duplex printing;

FIG. 21D shows an influence of show-through in two-up, duplex printing;

FIG. 21E shows an influence of show-through in two-up, duplex printing;

FIG. 21F shows an influence of show-through in two-up, duplex printing;

DESCRIPTION OF THE EMBODIMENTS

A best mode for carrying out the present invention will be described with reference to the attached drawings. It should be noted that the constituent elements described in the following embodiments are exemplary only, and the scope of the invention is not limited thereto.

First Embodiment

Figure 1:
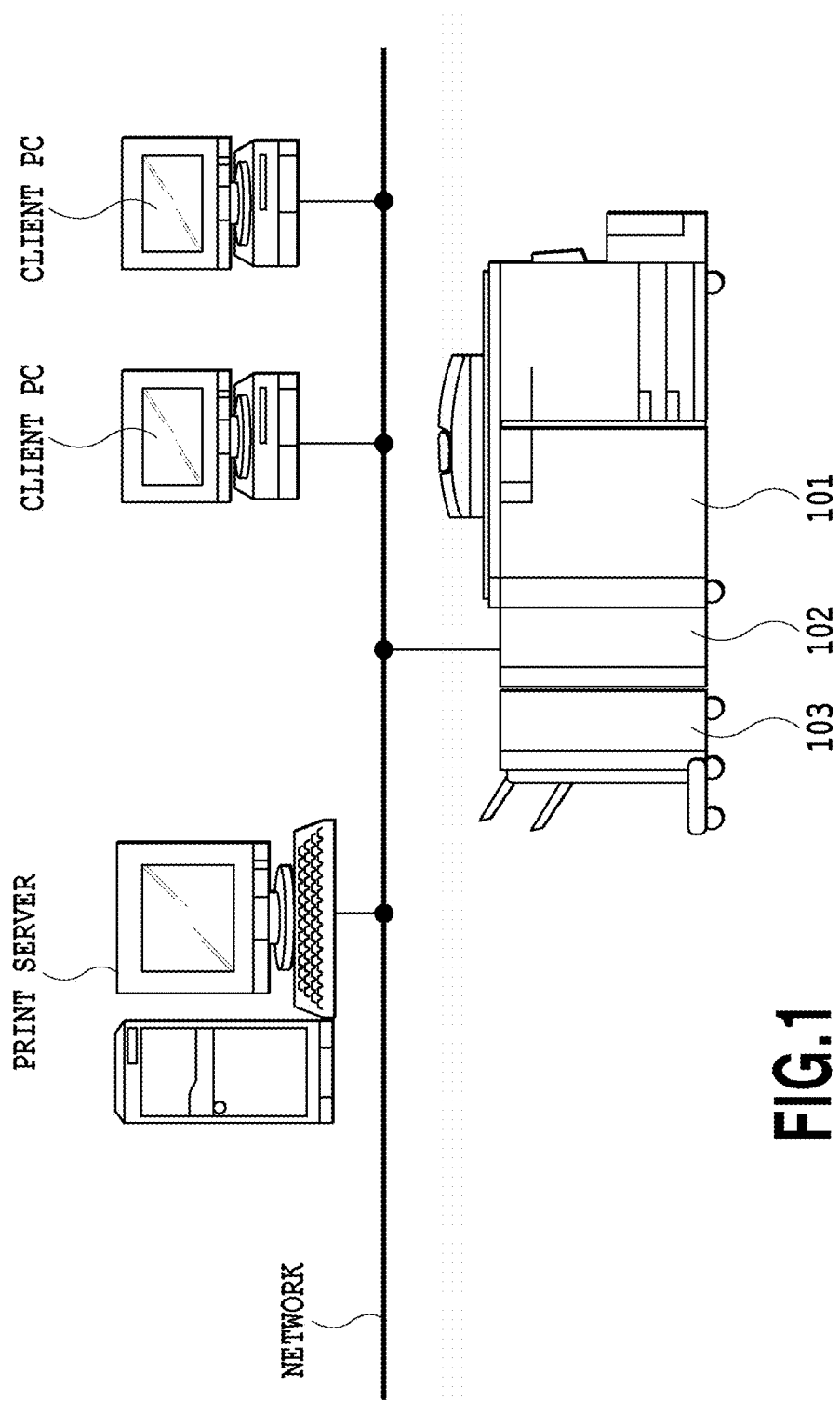
FIG. 1 shows a system configuration.

FIG. 1 shows an exemplary system configuration including an inspection apparatus in accordance with one embodiment of the present invention. An image forming apparatus 101 processes various input data and performs printing. An inspection apparatus 102 receives a printed material from the image forming apparatus 101 and inspects for its output content. A finisher 103 receives a hard copy that is inspected in the inspection apparatus 102. The image forming apparatus 101 is connected to an external print server or client PC via a network. The present embodiment describes an apparatus (inspection system) based on an inline inspection system that performs every step of inspection, from image formation to image inspection and finishing.

[Configuration of the Image Forming Apparatus]

Figure 2:
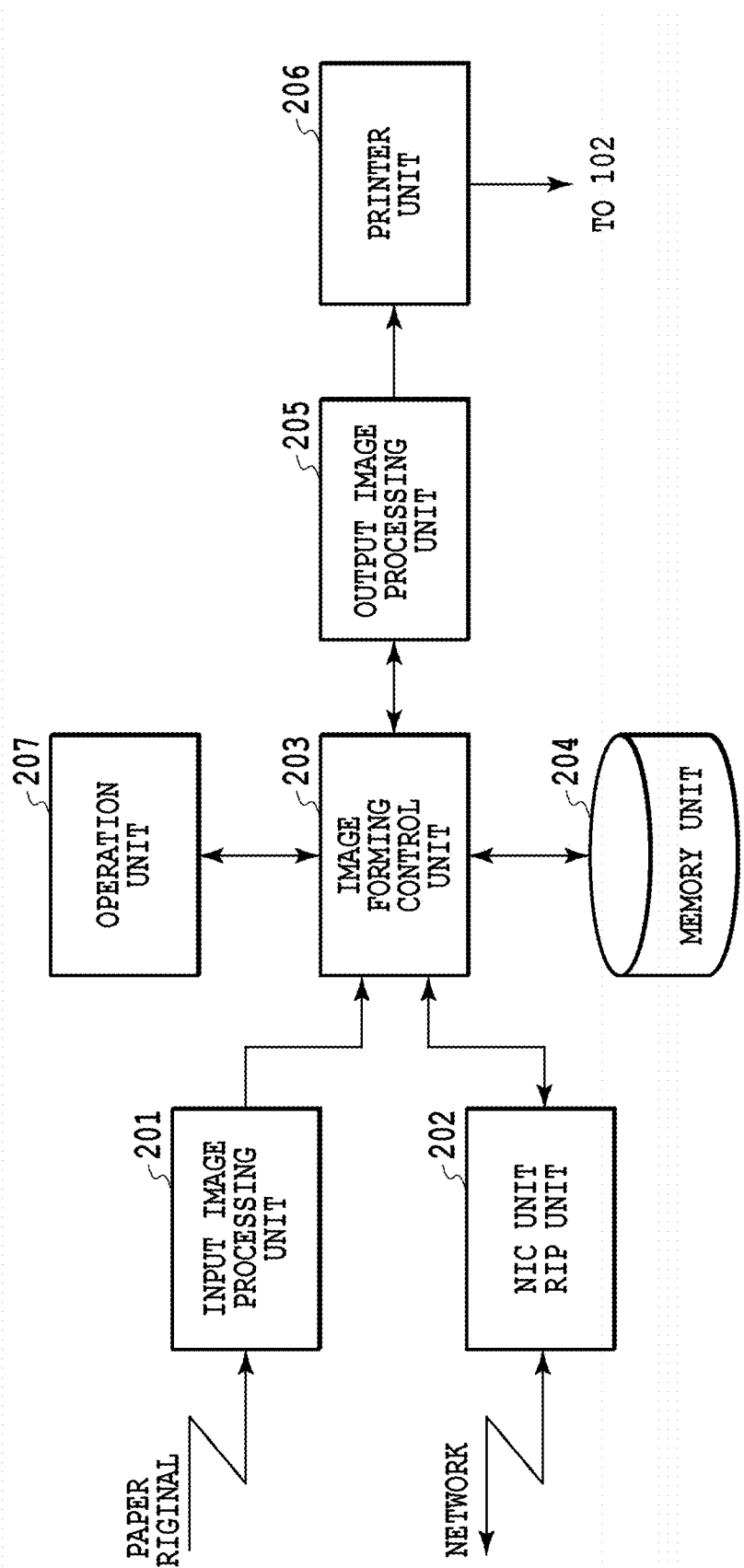
FIG. 2 is a block diagram of a printer control unit in an image forming apparatus.

Referring to FIG. 2, a configuration of a printer control unit in the image forming apparatus 101 will be described. In FIG. 2, an input image processing unit 201 reads a paper original, or the like, by an image reader such as a scanner, and performs image processing on the read image data. A unit 202 consists of a Network Interface Card (NIC) and a Raster Image Processor (RIP). In the unit 202, the NIC unit receives input image data (mainly, page description language (PDL) data) via a network. The NIC unit also transmits image data and apparatus information to the outside of the image forming apparatus 101 via the network. The RIP unit decodes and expands the input PDL data to printable and displayable bit map data.

Next, the input image data is sent to an image forming control unit 203. The image forming control unit 203 serves to control input data or output data, which is controlled by a central processing unit (CPU) (not shown). The image data inputted to the image forming control unit 203 is temporarily stored in a memory unit 204. The stored image data is temporarily held and called as necessary. An output image processing unit 205 performs image processing on the image data for printing, and transmits the image data to a printer unit 206. The printer unit 206 feeds a sheet and prints, in turn, the image data processed in the output image processing unit 205 on the sheet. The printed sheet is sent out to the inspection apparatus 102. An operation unit 207 makes selections of the above-described flows and functions, and sends instructions for operation. The operation unit 207 includes a liquid crystal display (LCD), a capacitive touch panel, and the like.

Figure 3:
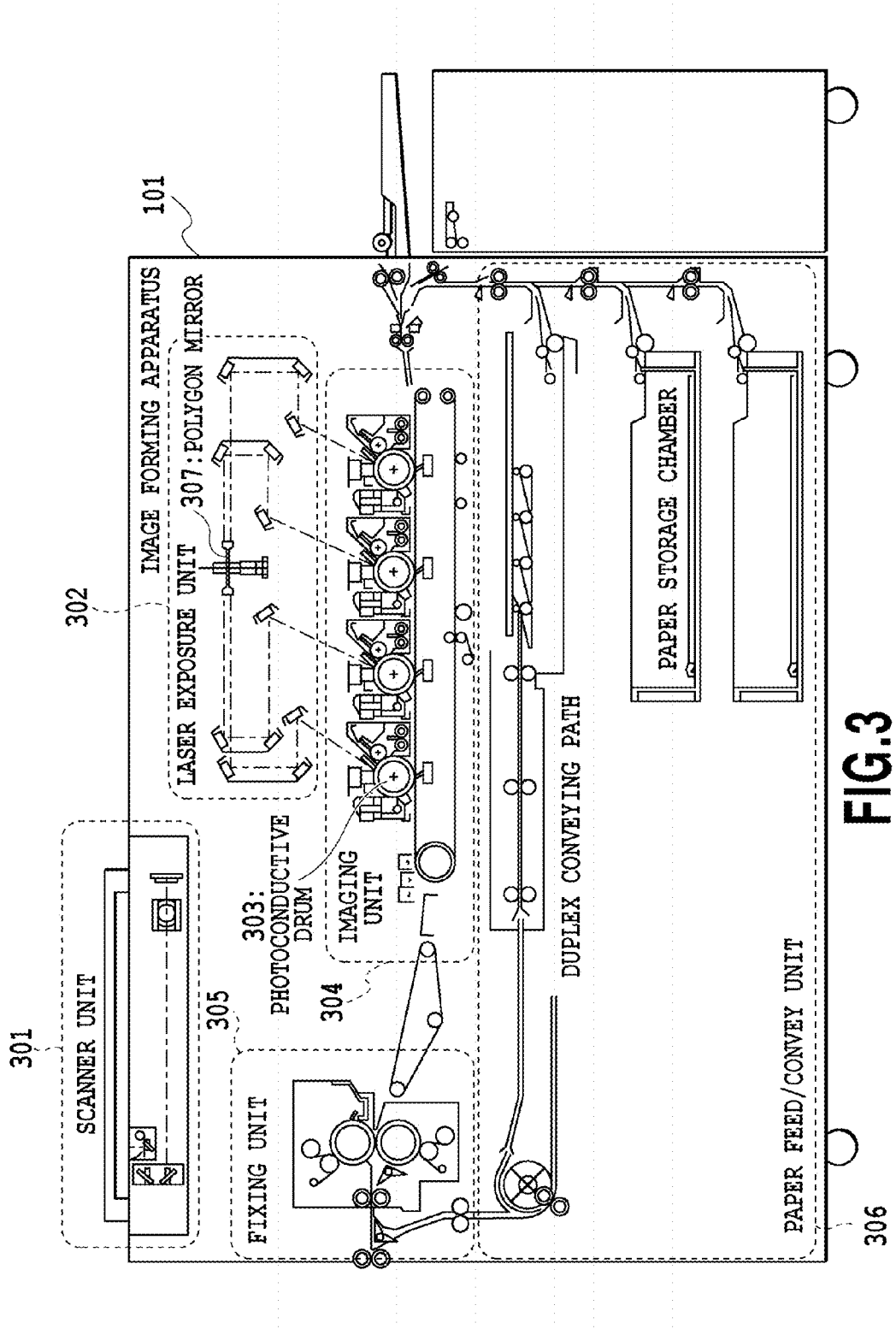
FIG. 3 shows a configuration of a printer unit in the image forming apparatus.

FIG. 3 shows a hardware configuration of the printer unit in the image forming apparatus 101. The image forming apparatus 101 includes a scanner unit 301, a laser exposure unit 302, a photoconductive drum 303, an imaging unit 304, a fixing unit 305, a paper feed/convey unit 306, and the printer control unit for controlling them as shown in FIG. 2. The scanner unit 301 optically reads a document image by illuminating the document placed on a document glass and converts the image into electrical signals to generate image data. The laser exposure unit 302 causes a light beam, such as laser light modulated in accordance with the image data, to enter into a rotating polygon mirror 307 that rotates at a constant angular velocity, and irradiates the photoconductive drum 303 with the light beam as reflected scanning light. The imaging unit 304 rotationally drives the photoconductive drum 303, charges the photoconductive drum 303 by using a charging unit, and develops with toner a latent image formed on the photoconductive drum by the laser exposure unit. The imaging unit 304 transfers the toner image onto a sheet and collects micro toner that is not transferred, but left on the photoconductive drum. The imaging unit 304 has four developer units (development stations) for a sequence of electrophotographic processes. The four developer units, having cyan (C), magenta (M), yellow (Y), and black (K), arranged in this order, start imaging with a cyan station, and after a predetermined period of time, perform an imaging operation in turn with a magenta, yellow, and black station. Such timing control allows a full-color toner image to be transferred onto the sheet without a color shift. While the present embodiment assumes a color printer, the embodiment is not limited thereto, and in a case of a black and white printer, only a black developer unit is installed.

The fixing unit 305 has a combination of rollers and belts, and a heat source, such as a halogen heater. Toner on a sheet having a toner image transferred thereon by the imaging unit 304 is melted and fixed by applying heat and pressure thereto. The paper feed/convey unit 306 has one or more paper storage chambers, such as a paper cassette or a paper deck, separates a sheet from a plurality of sheets of paper stored in the paper storage chamber, and conveys it to the imaging unit 304 and fixing unit 305 according to an instruction by the printer control unit. Onto the conveyed sheet, the toner image is transferred with colors by the above-mentioned development stations, and finally, a full-color toner image is formed on the sheet. To form an image on both sides of the sheet, the sheet passed through the fixing unit 305 is controlled to be conveyed along a conveying path to return to the imaging unit 304. The image forming control unit 203, which controls the entire image forming apparatus 101, communicates with each unit, as shown in FIG. 2, and performs control according to the instruction. The image forming control unit 203 also manages conditions of the scanner unit, laser exposure unit, imaging unit, fixing unit, and paper feed/convey unit, and provides instructions for each unit so that all the units are balanced for smooth operation.

[Internal Configuration of the Inspection Apparatus]

Figure 4A:
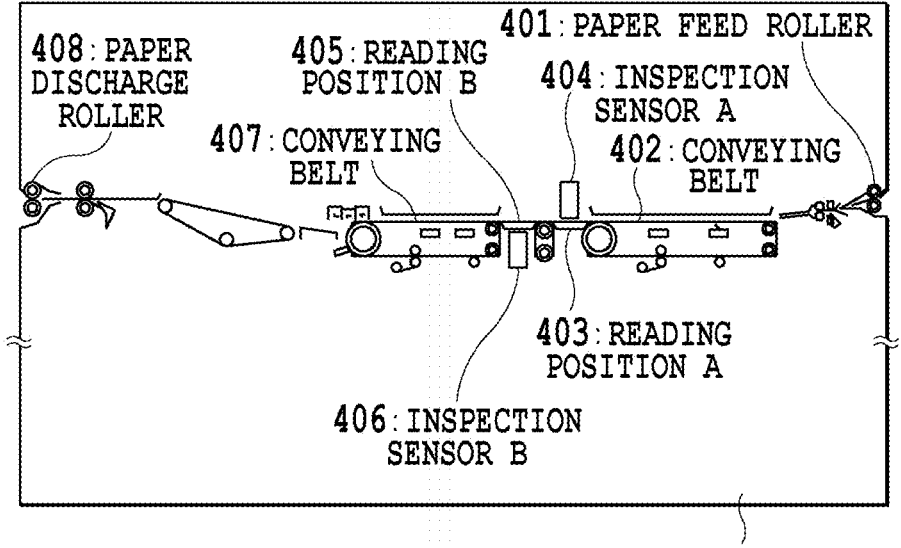
FIG. 4A illustrates an inspection apparatus.

FIG. 4A shows a schematic internal configuration of the inspection apparatus 102. The sheet printed in the image forming apparatus 101 is brought into the inspection apparatus 201 by a paper feed roller 401. Then, the sheet is conveyed on a conveying belt 402, and image data is read by an inspection sensor A 404 at a reading position A 403. The read image data is used for inspection determination in an inspection processing unit provided for the inspection sensor A 404. In a case of duplex printing (printing on both sides of the sheet), an image on the other side of the printed sheet, namely, the reverse side of the printed surface read by the inspection sensor A 404, is read by an inspection sensor B 406 at a reading position B 405. The read image data is used for inspection determination in an inspection processing unit provided for the inspection sensor B 406. The sheet passed through the inspection sensor B 406 is conveyed on a conveying belt B 407. Inspection determination results provided by the inspection sensor A 404 and the inspection sensor B 406 are used for final inspection determination of the sheet. Incidentally, the sheet for which the inspection processing is completed by the inspection apparatus 102 is discharged from a paper discharge roller 408.

Figure 4B:
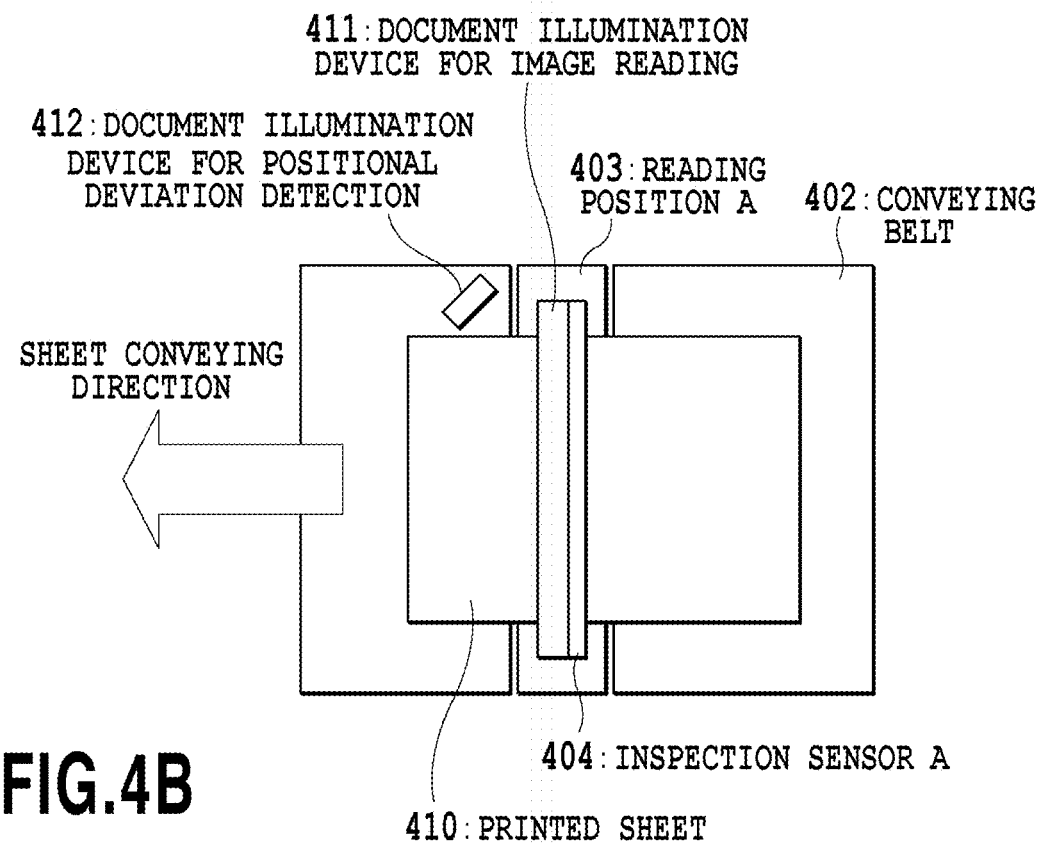
FIG. 4B illustrates an inspection apparatus.

FIG. 4B is an exemplary top view of a portion of the conveying belt 402. The inspection sensor A 404 herein is a line sensor for reading per line an entire image on a sheet 410 conveyed as shown, at the reading position A 403. It should be noted that the inspection sensor A 404 is not limited to the line sensor, but may be an imaging embodiment on an area basis which is used for digital cameras, or the like. That is, any embodiment having a device/mechanism capable of reading image data conveyed on the conveying belt 402 may be used. A document illumination device for image reading 411 illuminates a sheet while the inspection sensor 404 reads an image. A document illumination device for positional deviation detection 412 determines whether a sheet position is deviated in a sheet conveying direction while the sheet is conveyed on the conveying belt 402. The document illumination device for positional deviation detection 412 diagonally illuminates the conveyed sheet to read a shadow image at an end of the sheet to detect a positional deviation.

The scanned image of the printed material read by the inspection sensor A 404 is converted into electrical signals and is subjected to correction processing such as sheet positional deviation correction. The sheet positional deviation correction processing is performed in the following process. The document illumination device for positional deviation detection 412 illuminates a sheet conveyed on the conveying belt 402 and reads a shadow formed at the end of the sheet by the inspection sensor 404 to detect a difference between predetermined angles.

Figure 5A:
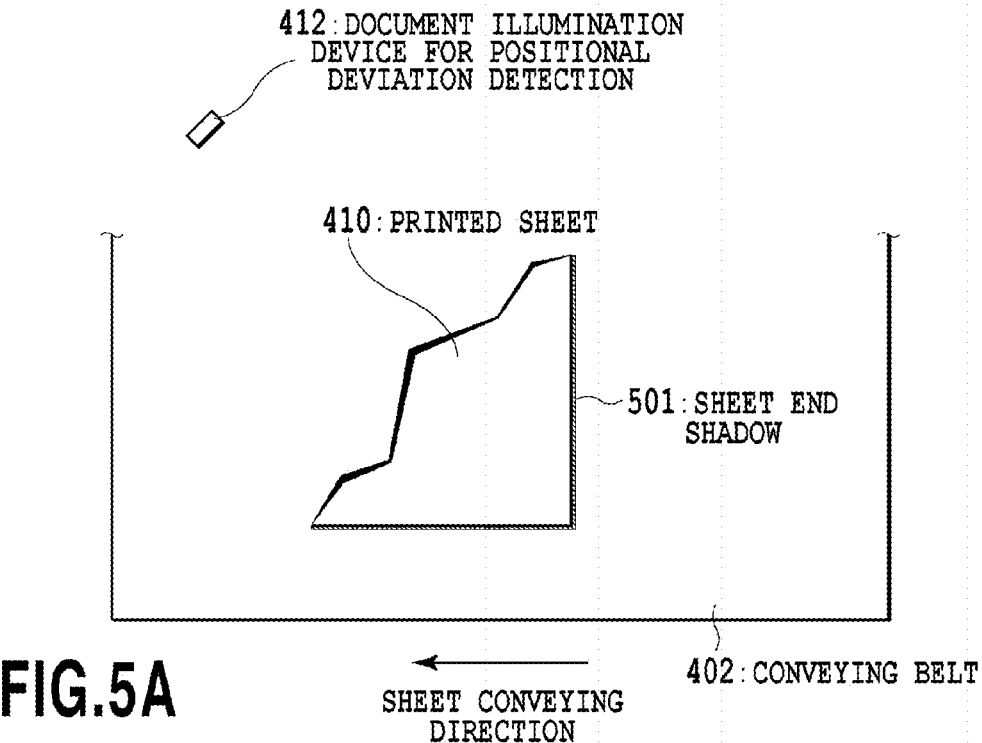
FIG. 5A illustrates a processing algorithm for inspecting a positional deviation of paper.

Referring to FIG. 5A, detection and determination of a positional deviation of an image will be described. The sheet 410 conveyed on the conveying belt 402 is illuminated by the document illumination device for positional deviation detection 412, which is placed diagonally with respect to a sheet conveying direction and upwardly with respect to the conveying belt 402. Upon illumination, a sheet end shadow 501 is created at a rear end of the sheet 410.

Figure 5B:
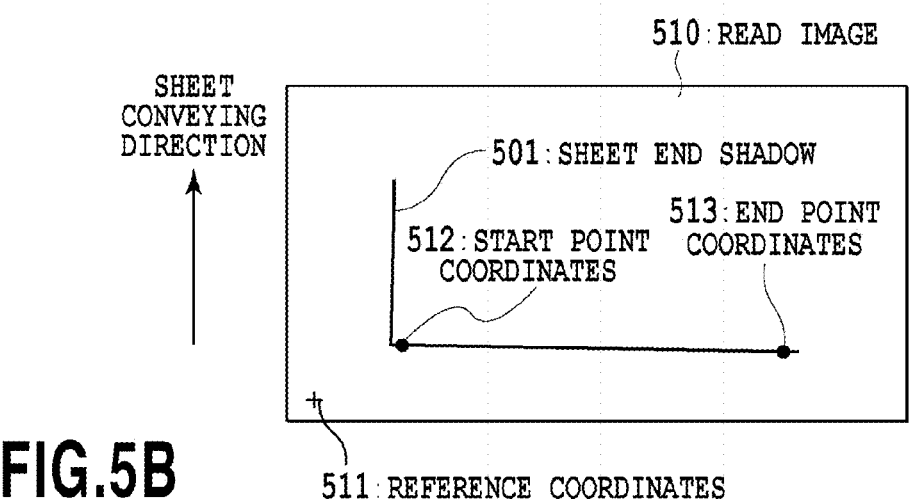
FIG. 5B illustrates a processing algorithm for inspecting a positional deviation of paper.

This shadow is read by the inspection sensor 404. The read shadow image is binarized and subjected to edge detection processing, or the like, to detect an inclination of the shadow image. In this case, the sheet end shadow used for inclination detection may be calculated either in a sheet conveying direction or in a direction orthogonal to the sheet conveying direction, or may be calculated in both directions to obtain an average. For inclination detection, first, the read image data by the inspection sensor 404 is binarized and subjected to edge detection processing, or the like, and in a case when the image thereafter appears as shown in FIG. 5B, reference coordinates 511 are set. Then, predetermined start point coordinates 512 and end point coordinates 513 are set on the image of the sheet end shadow 501. Relative coordinates from the reference coordinates 511 to the start point coordinates 512 and to the end point coordinates 513 are determined accordingly.

In a case when the reference coordinates 511 are coordinates (0, 0), the start point coordinates 512 are coordinates (300, 245), and the end point coordinates 513 are coordinates (235, 3885), an inclination θ (deg) between the start point coordinates 512 and the end point coordinates 513 are represented by the following equation (1):

$$\theta = \tan^{-1}\left(\frac{(235-300)}{(3885-245)}\right) = -1.023 \text{(deg)}.$$

That is, the sheet 410 is detected to be inclined by 1.023° in a clockwise direction with respect to the sheet conveying direction.

On the basis of the detected inclination angle and information on inclination and rotational directions, rotation processing is applied to the entire image data read by the inspection sensor 404. The image data to which rotation processing is applied will serve as comparative data in the subsequent inspection processing. In the above description, a case of scanning the sheet conveyed on the conveying belt 402 from a top side of the apparatus has been explained. The same process applies to a case of scanning the back side of the sheet in duplex printing. That is, the image data read by the inspection sensor 406 will serve as comparative data in the subsequent inspection processing.

It is not necessary to detect an angle of positional deviation at respective positions of the inspection sensor 404 and the inspection sensor 406. That is, an angle of positional deviation detected at a position of the preceding inspection sensor 404 may be applied to the image data read by the inspection sensor 406 for rotation processing. However, in a case when the inspection sensor 404 and the inspection sensor 406 are positioned apart by a conveying belt A 402 or a conveying belt B 407, an angle of positional deviation may be changed during conveyance. In this case, an angle of positional deviation is detected at respective positions of the inspection sensors.

[Details of Inspection Processing]

Referring to other figures, inspection processing will be described. FIG. 6A shows input image data 601. In FIG. 6A, the input image data 601 consists of a text document (text object) 602 and a graphic (graphic object) 603. In a case of simplex printing (printing on a single side of the sheet), image data is read by the inspection sensor A 404. FIG. 6B shows the read image data 604. In FIG. 6B, image data 605 represents the read image data of the text document 602. Image data 606 represents the read image data of the graphic object 603. A print defect portion 607 is formed on the sheet in printing. The inspection processing compares the input image data 601 with the read image data 604 read by the inspection sensor 404. In the examples of FIGS. 6A and 6B, the input image data 601 does not include the print defect portion 607. Accordingly, difference image data 608 is shown in FIG. 6C based on a difference between the input image data 601 and the read image data 604.

Inspection determination is performed referring to the difference image data 608. The input image data 601 and the read image data 604 consist of multivalued image data. Thus, difference data 609 corresponding to the print defect portion 607 in the difference image data 608 consists of multivalued image data.

Referring to FIGS. 7A to 7D, the inspection determination using the difference data 609 will be described. FIG. 7A shows a pixel position and difference data (density) for each of eight pixels taken from the difference data 609 in a main scanning direction. These pixels are defined as pixel A, pixel B, and pixel C from the left, and the eighth pixel is defined as pixel H. An inspection determination unit provided inside the inspection sensor A 404 performs inspection processing on this difference image data (the inspection determination unit may be provided outside the inspection sensor A 404). In applying a low inspection standard (threshold 1), all of the pixels A to H included in the difference image data are determined to have values below a reference value. Thus, an OK inspection determination result is given. This is shown in FIG. 7B. However, in applying a little higher inspection standard (threshold 2), the pixels D and E included in the difference image data are determined to have values above the reference value. Thus, an NG inspection determination result is given to these two pixels. This is shown in FIG. 7C. Note that the threshold 2 is smaller than the threshold 1. Further, in applying a high inspection standard (threshold 3), all of the pixels A to H included in the difference image data are determined to have values above the reference value. Thus, an NG inspection determination result is given to all of the pixels. This is shown in FIG. 7D. Note that the threshold 3 is smaller than the threshold 2. Since the inspection determination (determination on whether or not the printed page is proper) for an entire document (page) is performed based on the number of pixels (pixel ratio) having an NG inspection determination result, the inspection determination result on a pixel basis greatly affects the determination result of the document. Although a threshold, namely, an inspection standard, is directly applied to the difference data 609 in the above description, it is also possible to quantify the difference data 609 and to apply an inspection standard (threshold) associated with a result of the quantification.

In commercial printing systems, such as POD, there is a need for generating printed materials with high precision from input image data. Therefore, a higher inspection standard is desired. However, as described above, application of a high inspection standard (threshold) leads to an increase in the number of printed materials that cannot pass the inspection, causing the printing systems to halt. Further, an increasing number of printed materials that cannot pass the inspection may be conveyed to a finisher. Although it is considered that proper inspection processing is performed in a case when all of the printed materials that did not pass the inspection have a print defect portion 609 as shown in FIG. 6C, there may be a case when a printed material cannot pass the inspection due to a show-through image on the back side in duplex printing.

[Influence of Show-Through in Duplex Printing]

Figure 20A:
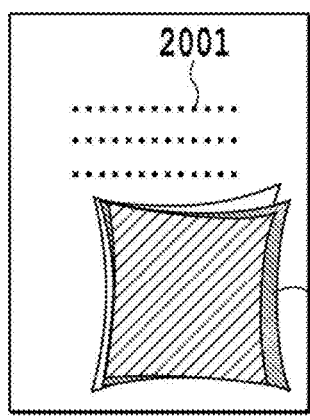
FIG. 20A shows an influence of show-through in duplex printing.
Figure 20B:
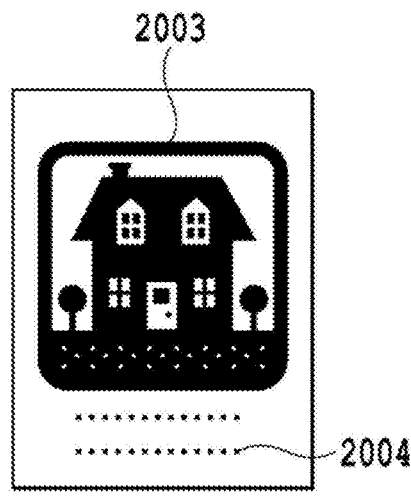
FIG. 20B shows an influence of show-through in duplex printing.

Referring to FIGS. 20A to 20D, an influence of show-through in inspection processing will be described. FIG. 20A shows a first page of input image data. FIG. 20B shows a second page of the input image data. The first page consists of a text document 2001 (text object) and a graphic 2002 (graphic object) with a low density. The second page consists of a graphic 2003 (graphic object) with a high density and a text document 2004 (text object).

Figure 20C:
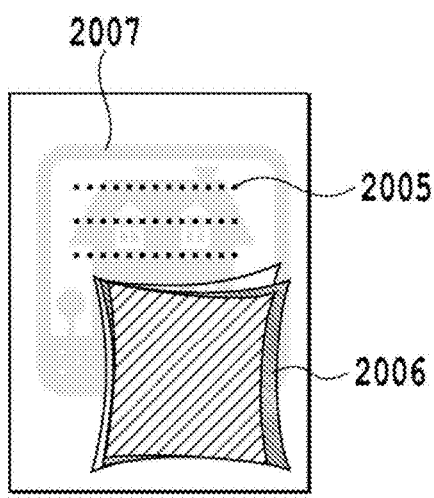
FIG. 20C shows an influence of show-through in duplex printing.
Figure 20D:
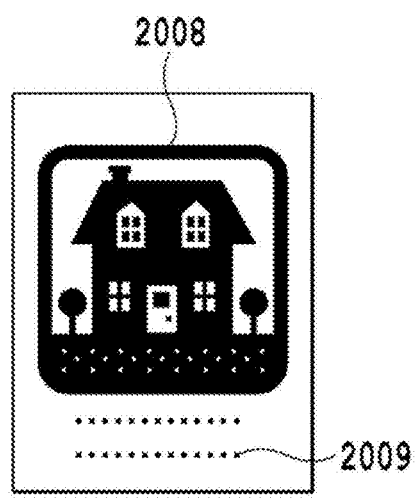
FIG. 20D shows an influence of show-through in duplex printing.

When the input image data is printed on both sides of a sheet, image data as shown in FIG. 20A appears on one side of the printed sheet, whereas image data as shown in FIG. 20B appears on the reverse side of the printed sheet. In the description hereafter, the reverse side of the sheet in duplex printing will be referred to as a "back side." In this description, a background color of a sheet is assumed to be white. The inspection apparatus 102 executes an inspection operation in duplex printing. That is, the inspection sensor A 404 performs reading of the image data of FIG. 20A at a reading position A 403 on the sheet conveyed on the conveying belt 402. The inspection sensor B 406 performs reading of the image data of FIG. 20B on a back side of the sheet. FIG. 20C shows the read image data by the inspection sensor A 404. FIG. 20D shows the read image data by the inspection sensor B 406.

FIG. 20C shows read image data 2005 of the text document 2001 and read image data 2006 of the graphic 2002. FIG. 20C shows image data 2007 on a back side, which is not included in the first page of the input image data, but is show-through image data of the graphic 2003 included in the second page. Such show-through occurs mainly for the following reason. In a case when a background color of a sheet is white and a front side consists of low density data, whereas a back side consists of high density data, the inspection sensor 404 reads the image data on a read surface (front side) as well as the image data on the back side as if it exists in the read surface under the influence of reading light passing through the sheet.

Such show-through occurs in a case when one side of a sheet has a low density area and its back side has a high density area, as described above. Therefore, show-through does not appear on the back side in the present example, that is, the read image data by the inspection sensor B 406 as shown in FIG. 20D does not include show-through of data on the back side.

The above example has described the show-through of input image data for two pages in duplex printing. Next, described is a case when input image data for four pages are printed in duplex printing, with two pages on one side of a sheet (two-up printing). Examples are shown in FIGS. 21A to 21F. FIG. 21A shows a first page of the input image data. FIG. 21B shows a second page of the input image data. FIG. 21C shows a third page of the input image data. FIG. 21D shows a fourth page of the input image data.

Figure 22A:
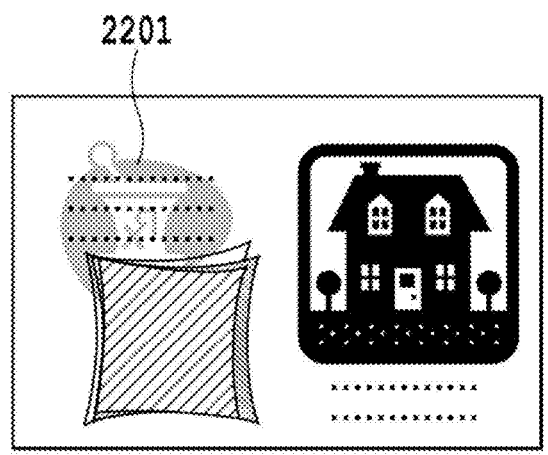
FIG. 22A shows an influence of show-through in a case of applying thin paper to a paper type.
Figure 22B:
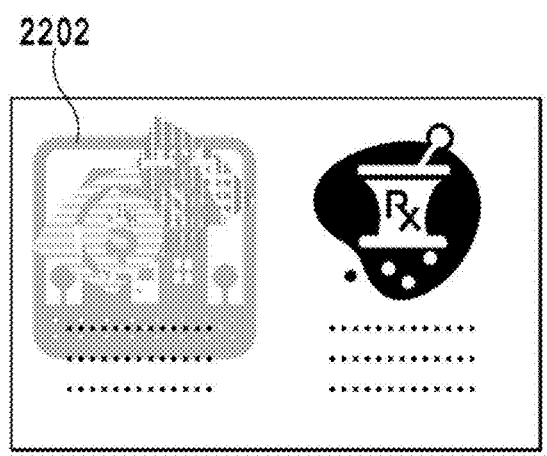
FIG. 22B shows an influence of show-through in a case of applying thin paper to a paper type.

FIGS. 21A to 21D show text documents 2101, 2104, 2106, and 2108, and graphics 2102, 2103, 2105, and 2107. The graphics 2102 and 2105 have a low density and the graphics 2103 and 2107 have a high density. In a case of printing the image data for four pages, with two pages on one side of a sheet, the pages shown in FIGS. 21A and 21B are printed on the same side. For the back side, the pages shown in FIGS. 21C and 21D are printed on the same side. The sheet printed in this manner is read by both the inspection sensor A 404 and the inspection sensor B 406. The read image data by the inspection sensor A 404 and the inspection sensor B 406 are shown in FIGS. 21E and 21F, respectively. In FIG. 21E, objects 2109, 2110, 2111, and 2112 correspond to read image data 2101, 2102, 2103, and 2104, respectively. In FIG. 21F, objects 2114, 2115, 2116, and 2117 correspond to read image data 2105, 2106, 2107, and 2108, respectively. In a booklet form, both sides of a sheet are printed with two pages on each side of the sheet, and, accordingly, the fourth page is printed on the back side of the first page, and the third page is printed on the back side of the second page. That is, the fourth page or the second page consisting of high density data is printed on the back side of the first page or the third page consisting of low density data. Therefore, the read image data by the inspection sensor A 404 includes show-through image data 2113 on the fourth page, and the read image data by the inspection sensor B 406 includes show-through image data 2118 on the second page. In this way, show-through occurs depending on density of data forming pages and layouts set for printing. In addition to layouts, show-through is also caused by reading light that passes through a read surface. Therefore, types of paper used for printing also affect occurrence of show-through. For example, a sheet having a sufficient thickness (thick paper) can minimize the transmission of reading light, thereby reducing a level of show-through. In contrast, a sheet having a small thickness (thin paper) can increase a level of show-through, allowing the inspection sensor A 404 or inspection sensor B 406 to capture the show-through. Input image data consisting of the image data of FIGS. 21A to 21D is printed on thin paper, with two pages on one side. FIGS. 22A and 22B show read image data by the inspection sensor A 404 and read image data by the inspection sensor B 406, respectively. As shown in FIGS. 22A and 22B, printing on thin paper increases a level of show-through of read image data 2201 and 2202.

[Influence of Show-Through on Inspection Processing]

In inspection processing by the inspection apparatus 102, input image data is compared with read image data by the inspection sensor A 404 or inspection sensor B 406. Upon comparison of the input image data with the read image data including show-through, even in a case when the read image data does not include a print defect portion, many unmatching pixels are generated as a result of the comparison of show-through portions, and an NG inspection determination result is given. In other words, even in a case when printing is properly carried out with high accuracy by an image forming apparatus, many printed materials may not pass the inspection due to the show-through. In the present embodiment, a density map, which will be described later, is created to prevent an influence of show-through for inspection determination with high accuracy.

[Creating Density Maps]

To maintain an inspection standard for inspection with high accuracy and to prevent an influence of show-through, it is necessary to expect at which pixel position of the image data read by the inspection sensor A 404 or inspection sensor B 406 the show-through occurs or how much the show-through occurs. In inline inspection systems, input image data is printed on a sheet according to a preset layout, and the inspection processing is performed on the printed sheet. Therefore, it is possible to check in advance whether high density data exists on a back side of the page with low density data. Moreover, since a type of paper used for printing can be easily set in the printing processing and inspection processing, it is also possible to determine how much the influence of transmittance of reading light can affect the show-through. In the present embodiment, the above feature is used to create a density map that represents pixel positions affected by show-through on the basis of layouts of the input image data on front and reverse sides and types of paper. In other words, the density map represents pixels in the input image data having a density value exceeding a threshold (to be described later with reference to FIG. 11), which is preset according to properties of paper, or the like, based on the assumption that show-through may occur. On the basis of the created density map, an influence of show-through is incorporated into the settings of the inspection standard (threshold).

Figure 8A:
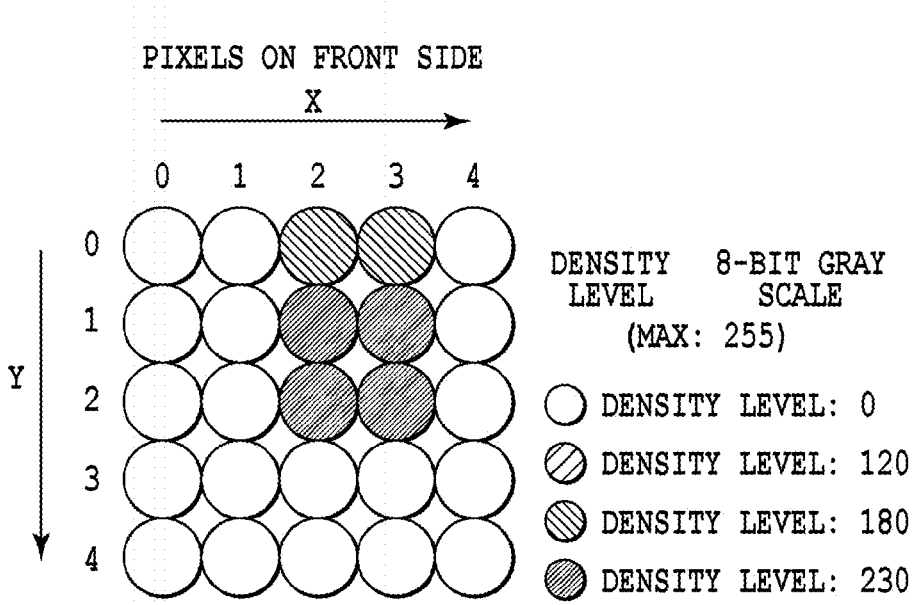
FIG. 8A is a block diagram of input image data on a front side.
Figure 8B:
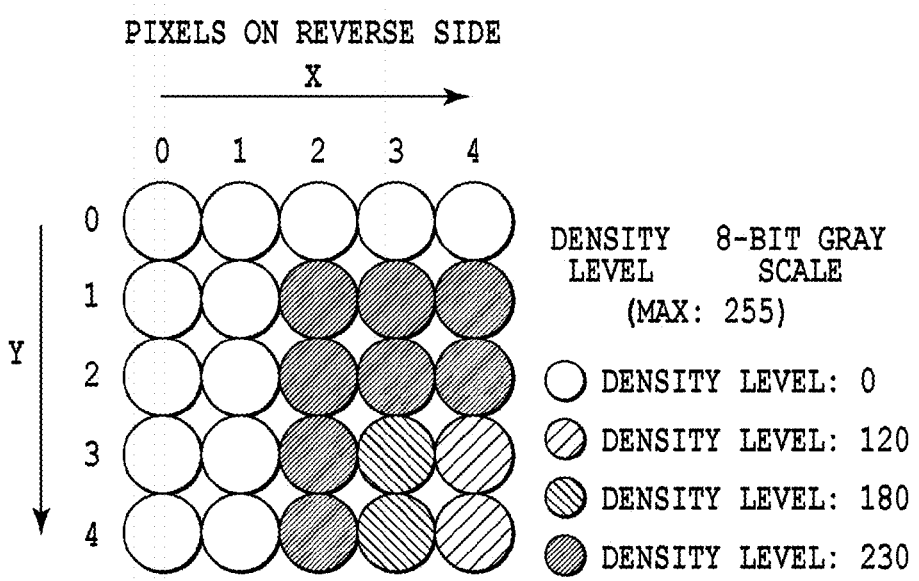
FIG. 8B is a block diagram of input image data on a back side.

FIGS. 8A and 8B show pixel data of the input image data on one side and on its back side. FIGS. 8A and 8B illustrate input image data consisting of five pixels in a scanning direction and five pixels in a sub-scanning direction, that is, a total of twenty-five pixels, for convenience. For coordinates of the pixels, the top left point is represented by (0, 0) as reference coordinates and the bottom right point is represented by (4, 4). The coordinates in FIGS. 8A and 8B are represented by (X, Y) where a value X represents a coordinate in a horizontal direction and a value Y is a coordinate in a vertical direction. The same applies to FIGS. 9A to 9D and 10A to 10B, which will be described later. Note that FIG. 8A shows input image data printed on one side (hereafter referred to as a front side) and FIG. 8B shows input image data on a back side (hereafter referred to as a reverse side) of FIG. 8A. In FIGS. 8A and 8B, each pixel consists of an eight-bit grayscale pixel, a white pixel has a density level of zero, and a light gray pixel has a density level of one hundred twenty. Further, a dark gray pixel has a density level of one hundred eighty and a black pixel has a density level of two hundred thirty. Accordingly, the front side consists of nineteen pixels having a density level of zero, two pixels having a density level of one hundred twenty, and four pixels having a density level of two hundred thirty. The reverse side consists of thirteen pixels having a density level of zero, two pixels having a density level of one hundred twenty, two pixels having a density level of one hundred eighty, and eight pixels having a density level of two hundred thirty. The pixels on the front side and the pixels on the back side correspond to each other at respective identical pixel positions (identical coordinate positions). For example, the pixel data (a density level of one hundred eighty) with coordinates (2, 0) on the front side corresponds to the pixel data (a density level of zero) with coordinates (2, 0) on the back side.

A density map is created by applying a threshold according to a type of paper (properties of paper) to pixel density values on front and reverse sides. Exemplary thresholds are shown in FIG. 11. Values shown in the table of FIG. 11 define density levels at which show-through is caused according to types of paper. A larger value indicates that a reference density level (threshold) at which show-through is caused is higher, and a density level equal to or lower than the value indicates that show-through is not caused. For example, in a case of applying a surface property of fine paper and a basis weight of thin paper, a threshold is one hundred, which means that a density level equal to or lower than one hundred is a level at which show-through is not caused. As a modification example, this threshold may be determined based on a degree of reflection of light from a light source provided for an image reader for printing, in addition to properties of paper.

Generally, a type of paper is determined based on a surface property and a basis weight. The basis weight indicates a basic quality of paper and is expressed as the weight per square meter. Thinner paper has a smaller basis weight and thicker paper has a larger basis weight. FIG. 11 shows thin paper, regular paper, and thick paper, which are given based on a relative ratio among basis weights. Each type of paper may be further divided. That is, thin paper may be divided into multiple types, such as thin paper 1, thin paper 2, and thin paper 3, according to a basis weight. Further, FIG. 11 shows three types of surface property, such as fine paper, recycled paper, and coated paper. Each type of surface property may be divided further according to a difference in transmittance of reading light, if any. The term "surface property" as used herein indicates surface smoothness of paper. Paper having a specific coating agent applied on its surface has a high surface smoothness and, thus, may prevent the reading light from passing through. Recycled paper has a low surface smoothness due to a rough texture of the paper. An uneven thickness of paper may increase a transmittance of reading light. Thresholds may be controlled based on another configuration in a case when a transmittance of reading light varies depending on a factor other than the two parameters: a basis weight and a surface property. For example, the configuration as shown in FIG. 11 may be controlled for each parameter, or parameters may be set outside the inspection apparatus 102 every time an inspection is performed.

In the present embodiment, creation of density maps for images shown in FIGS. 8A and 8B using standards of FIG. 11 will be described. FIGS. 9A to 9D show density maps in a case of applying a surface property of fine paper and a basis weight of thin paper shown in FIG. 11. A density map is obtained by comparing density levels on front and reverse sides as shown in FIGS. 8A and 8B with a threshold as shown in FIG. 11 and expressing the results using show-through flags. A show-through flag is represented by zero or one. In a case when a density level of the input image data for front and reverse sides is above a threshold, the show-through flag is represented by one. Otherwise, the show-through flag is represented by zero. For example, the show-through flag at the pixel position (0, 1) on the front side is represented by 0 because a density level of the pixel is zero, which is below a threshold of one hundred. The show-through flag at the pixel position (2, 0) on the front side is represented by one because a density level of the pixel is one hundred twenty, which is above a threshold of one hundred. FIGS. 9A and 9B show density maps created in this manner for respective front and reverse sides. A threshold shown in FIG. 11 indicates a density level indicating a degree of influence of show-through for each type of paper used for printing. It is indicated that the pixels having the show-through flag 1 in FIGS. 9A and 9B are more likely to cause show-through, whereas the pixels having the show-through flag 0 are less likely to cause show-through.

Next, show-through flags on the front side as shown in FIG. 9A and show-through flags on the reverse side as shown in FIG. 9B are used to determine a possible area of show-through on the basis of the inspection sensor A 404 or the inspection sensor B 406. As described above, show-through occurs in a case when a density difference, which is equal to or greater than a predetermined value, exists between front and back sides. That is, show-through occurs at a pixel position having the show-through flag 0 on the front side and a corresponding pixel position having the show-through flag 1 on the back side on the basis of the inspection sensor. FIGS. 9C and 9D show such a relation on the basis of the front or reverse side. On the basis of the front side (on the basis of the inspection sensor A 404), an area having the show-through flag 0 and the show-through flag 1 on the back side is represented by a shaded area 901. On the basis of the reverse side (on the basis of the inspection sensor B 406), an area having the show-through flag 0 and the show-through flag 1 on the back side is represented by a shaded area 902.

Figure 10A:
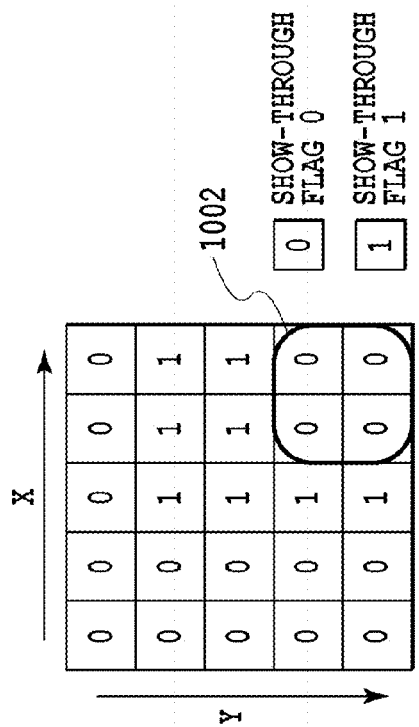
FIG. 10A is a block diagram of a density map in a case of applying a threshold on the basis of thick paper.
Figure 10B:
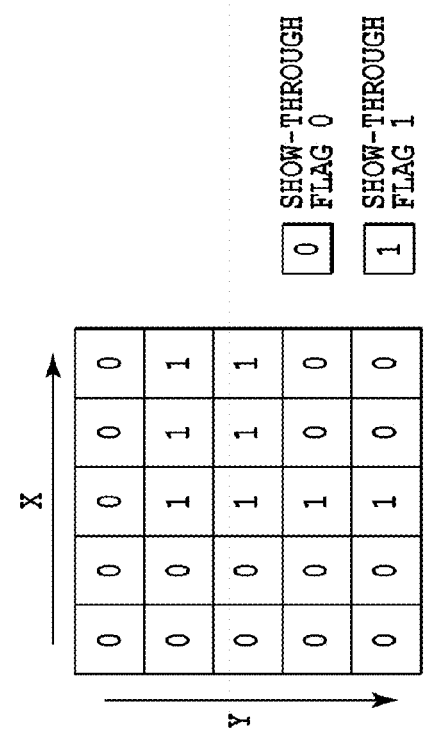
FIG. 10B is a block diagram of a density map in a case of applying a threshold on the basis of thick paper.
Figure 10C:
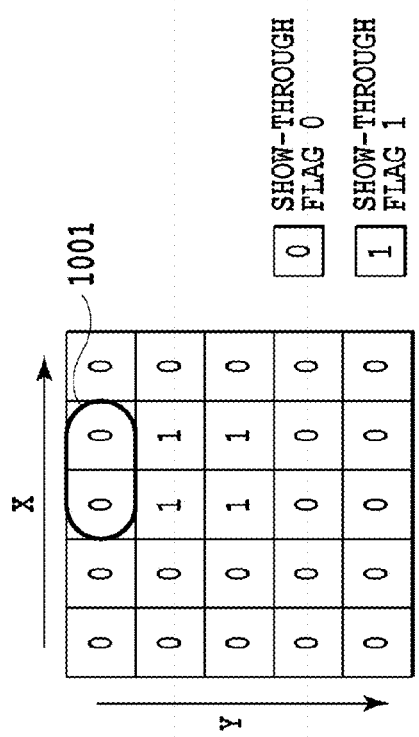
FIG. 10C is a block diagram of a density map in a case of applying a threshold on the basis of thick paper.
Figure 10D:
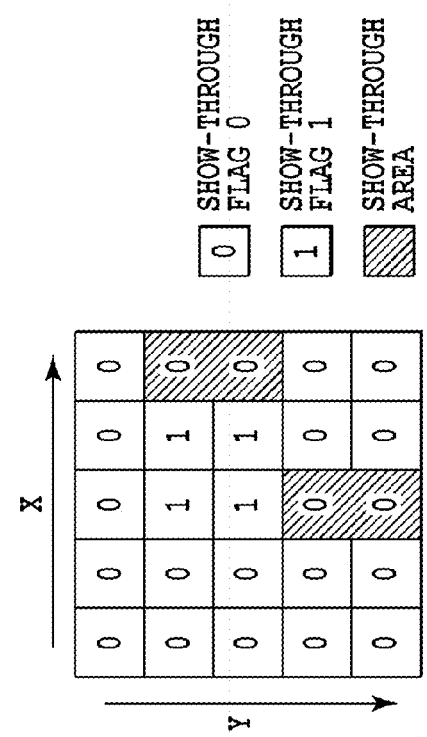
FIG. 10D is a block diagram of a density map in a case of applying a threshold on the basis of thick paper.

Next, FIGS. 10A to 10D show show-through flags on front and reverse sides in a case of applying a surface property of fine paper and a basis weight of thick paper. A threshold in this case is two hundred, which is different from the case of thin paper, as described above, and suggests that the influence of transmittance of reading light is smaller. That is, a threshold for the thick paper is larger than a threshold for the thin paper. Therefore, even on the basis of the same input image data, a created density map for the thick paper is different from that for the thin paper. FIG. 10A shows a density map in a case of applying the threshold to the input image data on the front side. FIG. 10B shows a density map in a case of applying the threshold to the input image data on the reverse side. In comparing the density maps for the thick paper with those for the thin paper as shown in FIGS. 9A and 9B, an area 1001 consisting of two pixels on the front side and an area 1002 consisting of four pixels on the reverse side have different show-through flags. Accordingly, in applying thick paper, on the basis of the front side (on the basis of the inspection sensor A 404), four pixels cause show-through at pixel positions with coordinates (4, 1), (4, 2), (2, 3), and (2, 4). This is shown in FIG. 10C. On the basis of the reverse side (on the basis of the inspection sensor B 406), the show-through flags in the area 1001 represent zero, and as a result, the pixel positions at which show-through occurs disappear. This is shown in FIG. 10C.

[Changing Inspection Standards by Using Pixel Positions at which Show-Through Occurs]

The pixel positions at which show-through occurs obtained by using density maps are used to switch inspection standards in inspection processing in the inspection apparatus 102. The purpose for this is to variably set an inspection standard to an applicable pixel position according to an influence of show-through, as read image data by the inspection sensor 404 or 406 is expected to be affected by show-through.

FIG. 12A shows eight pixels taken out from pixel data in a main scanning direction including pixels affected by show-through. In FIG. 12A, by using density maps, it is determined that pixel D and pixel E are affected by show-through (they are shaded differently from other pixels). As described above referring to FIGS. 9A to 9D or 10A to 10D, pixels affected by show-through are determined based on combinations of show-through flags 0 and 1 in the density maps. What is suggested by pixels affected by show-through is that the inspection sensor A 404 or B 406 captures a high density image on the back side. This means that read density levels are higher than expected density levels. Therefore, to the pixel D and pixel E, which are affected by show-through, an inspection standard (threshold) for show-through pixel positions is particularly applied. On the other hand, to pixels not affected by show-through (pixels A to C and pixels F to H in FIG. 12A), an inspection standard (threshold) for pixels not affected by show-through is particularly applied on the basis of the created density maps. Under such control, it is possible to avoid the results of FIG. 12C (pixels D and pixel E have an NG inspection result) obtained by uniformly applying an inspection standard for pixels not affected by show-through to all the pixels. Thereby, all the pixels are determined to have an OK inspection result as shown in FIG. 12B.

[Density Maps Based on Object Data]

Figure 13A:
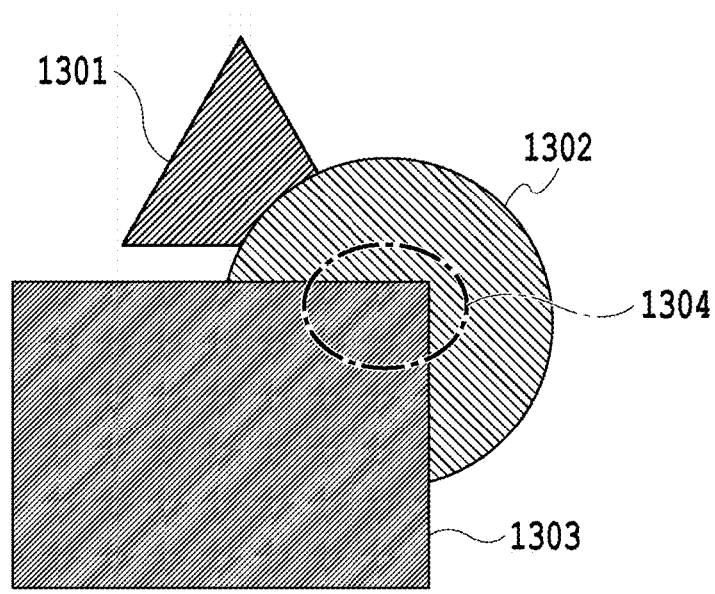
FIG. 13A is a block diagram of a density map based on objects.
Figure 13B:
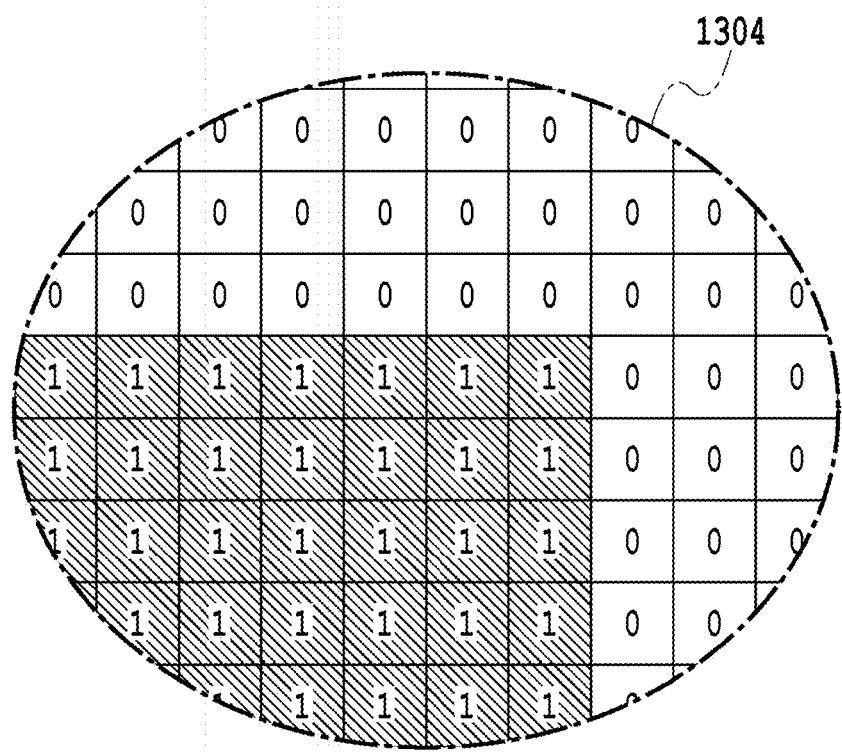
FIG. 13B is a block diagram of a density map based on objects.

The above description assumes that a density map is created on a pixel basis. However, the creation of a density map is not limited thereto. In a case when input image data is defined by objects, a density map may be created based on objects included in the input image data. FIG. 13A is a conceptual view of input image data defined by objects. Generally, density levels based on pixels included in objects can be obtained at a point when the objects are expanded into the last data. In particular, pixel data to be expanded can be obtained at a stage when a display list (DL) is read. FIG. 13A shows an object 1301 including pixel data with an intermediate density level, an object 1302 including pixel data with a low density level, and an object 1303 including pixel data with a high density level. In a case when a threshold for a surface property of fine paper and a basis weight of thick paper is applied as settings of a paper type, a high density object, namely, the object 1303, only has a density level at which show-through is caused. In this case, a density map created in an area 1304 is shown in FIG. 13B. Although the object 1302 with a low density level and the object 1303 with a high density level are overlapping, the object 1303 will be printed on paper on the top of the objects. Therefore, in the created density map, only the pixels positioned in the object 1303 are represented by the show-through flag 1.

The inspection processing in the case of creating a density map on an object basis is performed in the same manner as in the case of creating a density map on a pixel basis. That is, the density maps created based on objects included in the input image data are referred to on the basis of the front side and on the basis of the reverse side according to print layouts, and then the inspection processing is performed by changing an inspection standard (threshold) for a show-through area.

[Control Process of Inspection Processing]

Figure 14:
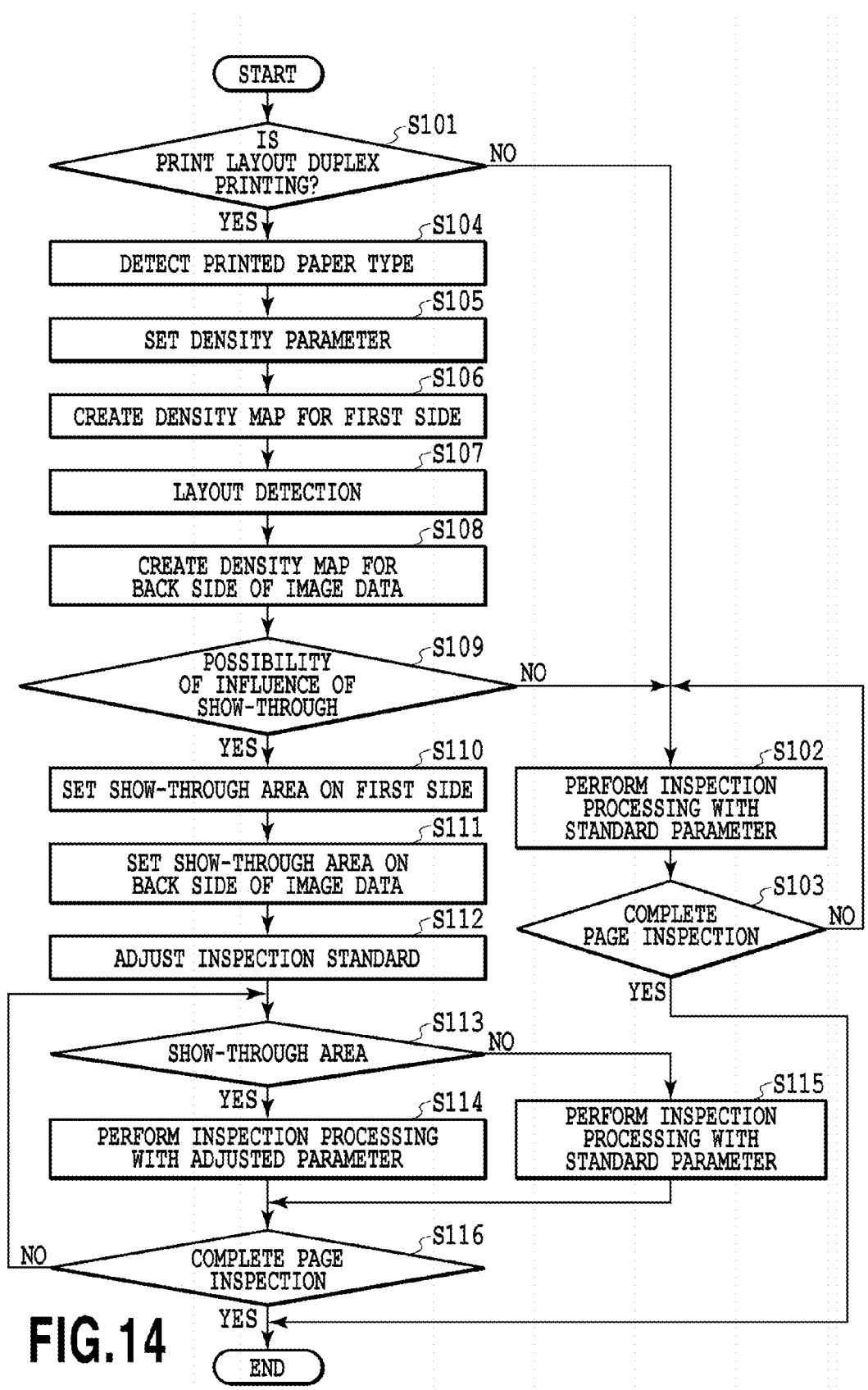
FIG. 14 is a flow chart of inspection control in accordance with a first embodiment.

Referring to other figures, control of processing by the inspection apparatus 102 in the present embodiment will be described. The inspection apparatus 102 has a control unit for controlling the entire processing by the inspection apparatus 102. FIG. 14 is a flow chart showing control by the inspection apparatus 102. The processing is performed by the control unit. The control unit has a processor, a ROM, and a RAM, and the processing performed by the control unit is achieved based on a program executed by the control unit.

The control unit awaits a print layout of the input image data to be specified. Once a user operating the inspection apparatus 102 specifies a print layout such as duplex printing or N-up, duplex printing via the operation unit 207, the control unit starts the inspection processing. The control unit first determines whether the specified print layout is duplex printing (step S101).

In a case of printing the input image data to be inspected on a single side (NO in step S101), there is no influence of show-through. Accordingly, the same inspection standard is applied to the entire image data for paper to perform the inspection processing (step S102). That is, the inspection sensor 404 reads a sheet and obtains a difference between the read image data and the input image data to determine whether the difference is equal to or less than a predetermined threshold for each page. The inspection processing of step S102 is continued until the inspection processing is completed for the entire input image data (step S103).

In step S101, in a case when the print layout as specified via the operation unit 207 is duplex printing (YES in step S101), the control unit detects a paper type (step S104). Regarding paper type detection, in a case when a paper feed unit such as a cassette provided for the image forming apparatus is associated with a paper type, a paper type may be automatically detected based on a specified cassette used in printing. The control unit may also await the operation unit 207 to specify a paper type.

Figure 15:
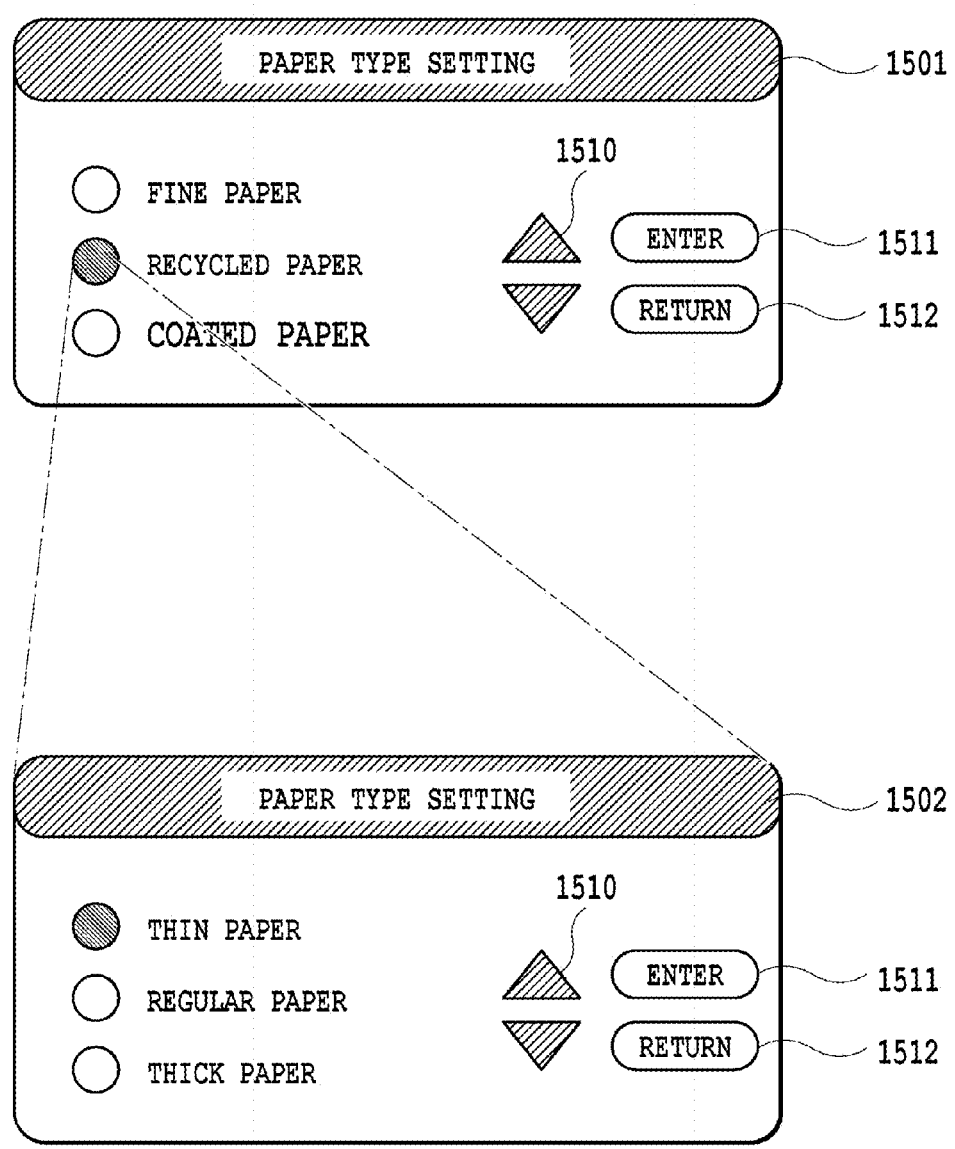
FIG. 15 is an exemplary operation unit for setting a paper type.

FIG. 15 shows a method for specifying a paper type via the operation unit 207. FIG. 15 shows exemplary menus on the operation unit 207 for selecting a paper type in two steps. A paper type is specified on a first menu 1501. A selection key 1510 is used to select a paper type, and an enter key 1511 is used to enter the selected paper type. A key 1512 is pressed to move to another menu from the paper type selection menu. On the first menu 1501, the selection key 1510 is pressed to select a surface property, and the enter key 1511 is pressed to switch to a second menu 1502 on the display of the operation unit 207. On the second menu, a basis weight is selected. For example, thin paper can be selected by the selection key 1510 and entered by the enter key 1511. The enter key 1511 is pressed on the second menu to select a paper type. It should be noted that the process of setting a paper type and the configuration of setting menus are not limited to the menu configurations used in the above description. Any configuration for specifying a type of paper fed by a paper feed roller 401 in performing inspection processing by the inspection apparatus 102 can be used.

Once the control unit detects a paper type in step S104, the process moves to density map parameter setting processing. That is, the control unit sets a threshold applied in creating a density map at a value according to a paper type specified in step S104. For example, in applying a threshold configuration of FIG. 11, a threshold of 200 is set for the paper type having a surface property of fine paper and a basis weight of thick paper (step S105).

By using the threshold as set in step S105, the control unit refers to the input image data to be printed on paper to create a density map on a front side (also referred to as a first side) (step S106). A density map may be created either on a pixel basis or on an object basis. By using the created density map, the control unit specifies, from the input image data printed on the first side, a pixel having a density value exceeding a density threshold at which show-through may occur (a standard density level at which show-through is caused), which is determined according to properties of paper having an image printed on both sides.

Next, the control unit detects a print layout on a back side as instructed in step S101 (step S107). In a case when the print layout specified in step S101 via the operation unit 207 is duplex printing, input image data on a page subsequent to the page for which the density map was created in step S106 is detected to be a back side (also referred to as a second side). In a case when the print layout specified in step S101 is two-up printing that prints input image data for two pages on one side of paper, page data to be printed on a back side is determined based on the input image data on a page subsequent to the page for which the density map was created in step S106. Detection of a print layout on a back side in step S107 is not limited to the above-mentioned print layouts. Input image data on a back side is detected according to any print layout supported by the image forming apparatus 101, including four-up printing and eight-up printing.

Once the detection of the input image data to be printed on the back side of step S106 is completed in step S107, the control unit creates a density map of the input image data on the back side (also referred to as back side image data) (step S108). That is, by using the created density map, the control unit specifies, from the input image data printed on a second side, a pixel having a density value exceeding a density threshold at which show-through may occur (a standard density level), which is determined according to properties of paper having an image printed on both sides (pixel specifying step).

Once the creation of the density maps for the image data for front and reverse sides of paper is completed in step S106 and step S108, the control unit determines whether read image data to be obtained by the inspection sensor A 404 and the inspection sensor B 406 is affected by show-through (possibility of show-through) (step S109). That is, on the basis of the inspection sensor A 404, it is checked if there is a pixel having the show-through flag 0 in the density map created in step S106 on the front side and having the show-through flag 1 in the density map created in the corresponding step S108. On the basis of the inspection sensor B 406, it is checked if there is a pixel having the show-through flag 0 in the density map created in step S108 on the reverse side, and having the show-through flag 1 in the density map created in the corresponding step S106. As a result of the comparison of density maps, in a case when it is determined that there is no pixel affected by show-through on the basis of the inspection sensor A 404 or the inspection sensor B 406 (NO in step S109), the inspection apparatus 102 performs standard inspection processing. That is, even for a sheet printed by duplex printing, the inspection apparatus 102 applies a normal inspection standard to the entire pages to perform inspection processing as in a case of printing other than duplex printing. That is, the inspection processing of step S102 and step S103 is performed.

The control unit checks if there is a pixel affected by the show-through on the basis of the inspection sensor A 404 or the inspection sensor B 406 according to combinations of density maps as shown in FIGS. 9A to 9D or FIGS. 10A to 10D. As used herein, "on the basis of the inspection sensor A 404" means that a reference surface is set to a surface of the sheet conveyed on the conveying belt 402 read by the inspection sensor A 404 from a top side of the inspection apparatus 102. Similarly, "on the basis of the inspection sensor B 406" means that a reference surface is set to a surface of the sheet conveyed on the conveying belt 402 read by the inspection sensor B 406 from a bottom side of the inspection apparatus 102.

In a case when it is determined that there is a pixel affected by show-through by the above-described process (YES in step S109), the control unit sets a show-through area on the basis of the inspection sensor A 404 (step S110). The control unit also sets a show-through area on the basis of the inspection sensor B 406 (step S111). That is, the control unit compares the image data on the front and back sides for which the pixel having a density value exceeding the threshold is specified in step S106 and step S108 (that is, the density maps are created), and according to the comparison results, specifies a show-through area in the printing results of the respective image data (area specifying step).

Once the control unit sets a show-through area on the basis of the inspection sensor A 404 and the inspection sensor B 406, an inspection standard applied to the show-through area is adjusted (step S112). That is, the control unit determines an inspection standard (determination threshold) applied to an area not affected by show-through and an inspection standard (determination threshold) applied to an area affected by show-through. Referring to FIGS. 12A to 12C, an inspection standard (determination threshold) level in an area not affected by show-through becomes a threshold applied to pixels A to C and F to H that are affected by show-through. An inspection standard (determination threshold) level in an area affected by show-through becomes a threshold applied to pixels D and E that are affected by show-through.

After the inspection standard adjustment in step S112, the control unit performs inspection processing. In the inspection processing, in a case when a pixel to be inspected is a show-through area (YES in step S113), the inspection standard for an area affected by show-through, which is adjusted in step S112, is applied for determination (step S114). That is, to a portion of the show-through area as specified in step S110 and step S111, the control unit sets a reference value for inspecting printed materials that is greater than a reference value set to other portions not specified as a show-through area. In other words, in inspection determination for a portion of the show-through area as specified on respective sides, the control unit specifies a determination threshold at which a printed material is more likely to pass the inspection. In step S113, in the inspection processing for a portion that is not the show-through area, an inspection standard that is not adjusted for the show-through area is used for determination (step S115). An inspection standard (determination threshold) applied for inspection processing is changed between a show-through area and other areas, so as to prevent a printed material from not passing the inspection due to the show-through. Until the inspection processing for a sheet is completed, the control unit repeats the inspection processing for duplex printing on all of the pixels included in the page. That is, the control unit repeats the processes from step S113 to step S114 or step S115 until all of the pixels included in the page are inspected (step S116). An inspection standard (reference value for inspection) is a threshold set to determine whether an inspection result is NG for a density difference between the input image data to be printed and the image data obtained by reading a printed material.

In accordance with the above-described first embodiment, an area in which show-through may occur is predicted at a point before creating read image data according to a print format of the input image data, and a different inspection standard is applied to the show-through area. Consequently, it is possible to perform effective inspection processing that prevents a printed material from not passing the inspection due to the show-through.

Second Embodiment

The first embodiment has described one-step inspection processing in which a print layout in printing input image data on a sheet is referred to and a show-through area is preset on the basis of the front side or on the basis of the reverse side, so that different inspection standards are applied in performing the inspection processing on a show-through area and outside the show-through area. In this case, however, the inspection processing is performed one time, in which inspection standards are changed by referring to density maps. In a second embodiment, two-step inspection processing will be described to further improve accuracy in inspection determination.

[Two-Step Inspection Processing Determination by Using Density Maps]

FIGS. 16A to 16F illustrate a concept in accordance with a second embodiment.

FIG. 16A shows a first page of input image data. This image data consists of a text document 1601 and a graphic 1602 with a low density. FIG. 16B shows a second page of the input image data. This image data consists of a graphic 1603 with a high density and a text document 1604. In a case when a print layout is duplex printing, on the back side of the text document 1601 and the graphic 1602 with a low density is positioned the graphic 1603 with a high density. Thus, the image data read by the inspection sensor 404 on the front side is shown in FIG. 16C. That is, in addition to read image data 1605 of the text document 1601 and read image data 1606 of the graphic 1602, there is show-through read image data 1607 of the graphic 1603.

In a case when the change of an inspection standard for a show-through area as described in the first embodiment is not performed, the read image data obtained as shown in FIG. 16C will have an NG inspection determination result. The higher the inspection standard is, the more likely data is to have an NG determination result even with a small degree of show-through, thereby decreasing production efficiencies of the inspection apparatus 102 and the image forming apparatus 101. At the same time, however, a higher inspection standard is an essential requirement to increase accuracy of the inspection apparatus. In the second embodiment of the present invention, a configuration of inspection determination that eliminates an influence of show-through even in applying a higher inspection standard is described.

Under the circumstances of applying a higher inspection standard, the read image data of FIG. 16C will have an NG inspection determination result due to an influence of show-through even in a case when a print defect portion is not included in a paper output. However, under the circumstances of applying a higher inspection standard, the first inspection determination result must be accepted. Thus, after obtaining the first inspection determination result with a higher inspection standard, an inspection error map is created for pixels with an NG inspection determination result. An inspection error map represents a pixel determined to be an error for each page in applying an inspection standard (determination threshold) to a difference between the input image data and the read image data. An inspection standard applied in this case is an inspection standard as set for the inspection apparatus 102. In the inspection error map, a pixel determined to be an error is represented by 1 and a pixel determined to be normal is represented by 0, for example.

FIG. 16D shows a concept of creating an inspection error map for the read image data of FIG. 16C. FIG. 16D conceptually shows an image 1608 of pixels determined to be inspection errors, indicating a show-through area. The inspection error map is created for the image 1608. For example, the inspection error map in an elliptical portion 1609 is shown by broken lines. NG inspection determination results in a longitudinal direction due to show-through on a pixel basis are represented by 1. This inspection error map shows determination results of differences between the show-through read image data and the input image data. Therefore, in a case when there is no difference between the inspection error map and a density map based on the print layout, it is possible to determine that the NG inspection determination results are caused by the influence of show-through. That is, a degree of influence of show-through on the NG inspection determination results can be determined on the basis of a difference between the inspection error map and the density map. In a case when the degree of influence is high (that is, in a case when there is a small or no difference between the inspection error map and the density map), second inspection processing is performed on the pixels determined to be errors in the inspection error map by applying an inspection standard for a show-through area as described in the first embodiment. In the second inspection processing, an OK inspection determination result may be obtained. Accordingly, the second inspection processing is performed so that inspection processing in consideration of the influence of show-through can be performed even under the circumstances when a higher inspection standard is set.

There may be a case when a print defect portion exists in the read image data. FIG. 16E shows a print defect portion 1610 in the image data read by the inspection sensor 404. FIG. 16F shows an inspection error map in this case. In addition to FIG. 16D, FIG. 16F shows an inspection error map 1611 for the print defect portion 1610. The inspection error map for the print defect portion is also created by applying an inspection standard to a difference between the input image data and the read image data. Therefore, a pixel determined to be an error is represented by 1 and a pixel determined to be normal is represented by 0 (1611).

Figure 17A:
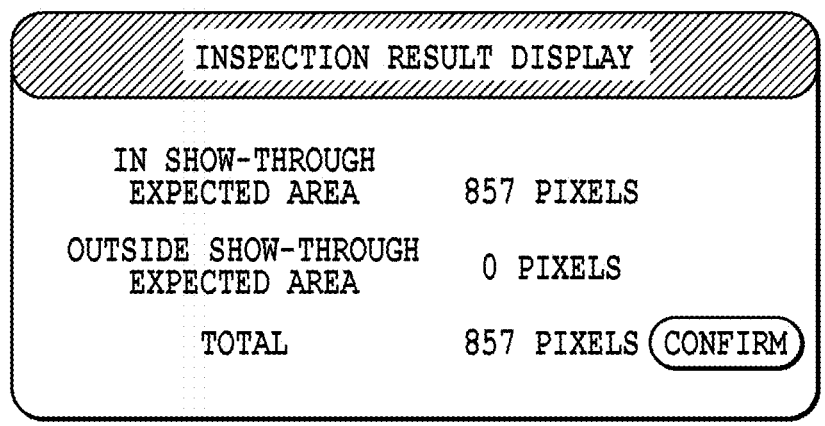
FIG. 17A is an exemplary inspection result display in accordance with the second embodiment.
Figure 17B:
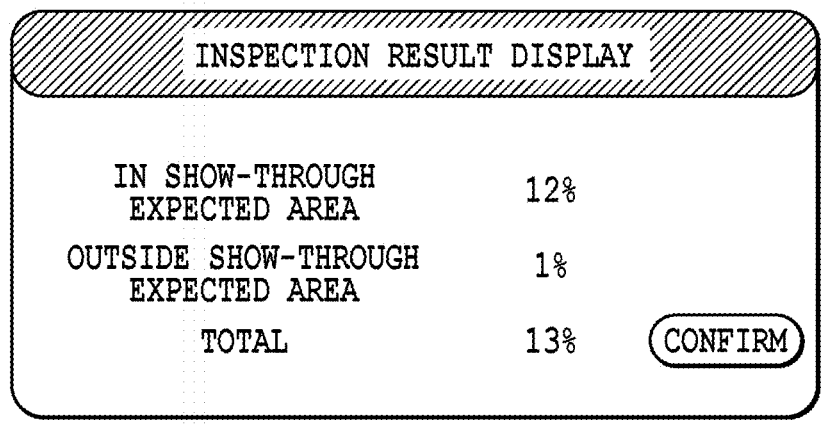
FIG. 17B is an exemplary inspection result display in accordance with the second embodiment.
Figure 17C:
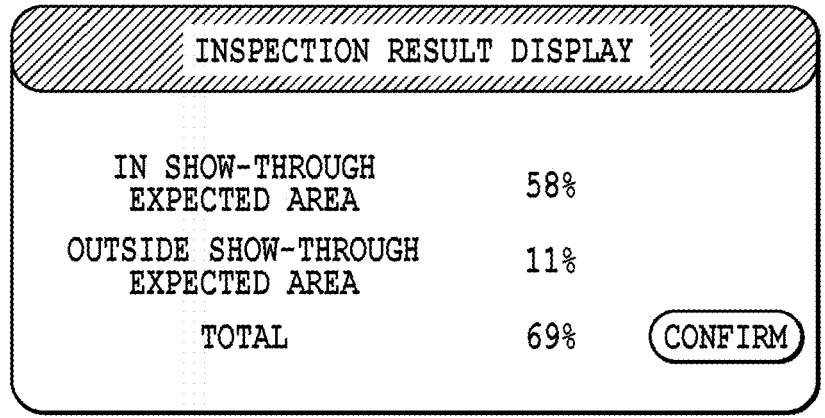
FIG. 17C is an exemplary inspection result display in accordance with the second embodiment.

It is determined, in consideration of an influence of show-through, whether to perform the second inspection processing based on whether a degree of concordance between an inspection error map and a show-through area obtained based on a target density map is equal to or greater than a predetermined value. FIGS. 17A to 17C show examples of displays on the operation unit 207, or the like, showing whether to perform the second inspection processing after the first inspection processing. FIG. 17A shows an embodiment of displaying a pixel level in the first inspection processing with an NG inspection determination result. In this example, eight hundred fifty-seven pixels are determined to be inspection errors in the first inspection processing, all of which are included in the show-through area (show-through expected area). That is, the pixels on the inspection error map created after the first inspection processing and the pixels in the show-through area obtained based on the target density map completely match, and the number of pixels is eight hundred fifty-seven.

It should be noted that the embodiment of display is not limited to the above example. For example, a ratio of all of the pixels forming read image data to pixels determined to be inspection errors shown in an inspection error map or a ratio of all of the pixels to pixels determined to be inspection errors in the show-through area (show-through expected area) created based on a density map may be displayed. This configuration is shown in FIG. 17B. FIG. 17B shows that 13% of the total pixels are determined to be inspection errors, and 12% of the inspection errors exist in the show-through area (in the show-through expected area). On the other hand, 1% of the total pixels are determined to be inspection errors outside the show-through area (outside the show-through expected area). Much more inspection errors exist in the show-through area than outside the show-through area in terms of percentages (a very small number of pixels are determined to be inspection errors outside the show-through expected area). In response to this, the apparatus is controlled to perform the second inspection processing. In the above case, a percentage of the inspection errors in the show-through area are close to a percentage of the inspection errors in the entire page. The second inspection processing (which is performed by changing the inspection determination standard applied to the show-through area to a lower standard) is performed since a possibility of obtaining an OK inspection determination result is high.

In contrast, FIG. 17C shows that 58% of the total inspection errors (a high error ratio) exist in the show-through area and 11% of the total inspection errors (a relatively high error ratio) exist outside the show-through area. In this case, by performing the second inspection processing, a portion corresponding to 58% may have an OK inspection result by changing an inspection standard. However, a portion corresponding to the remaining 11% is less likely to overcome the NG inspection result because the NG result is due to a factor other than show-through. Thus, in such a case, the apparatus is controlled to perform subsequent processing based on the NG inspection result without performing the second inspection processing.

Figure 18A:
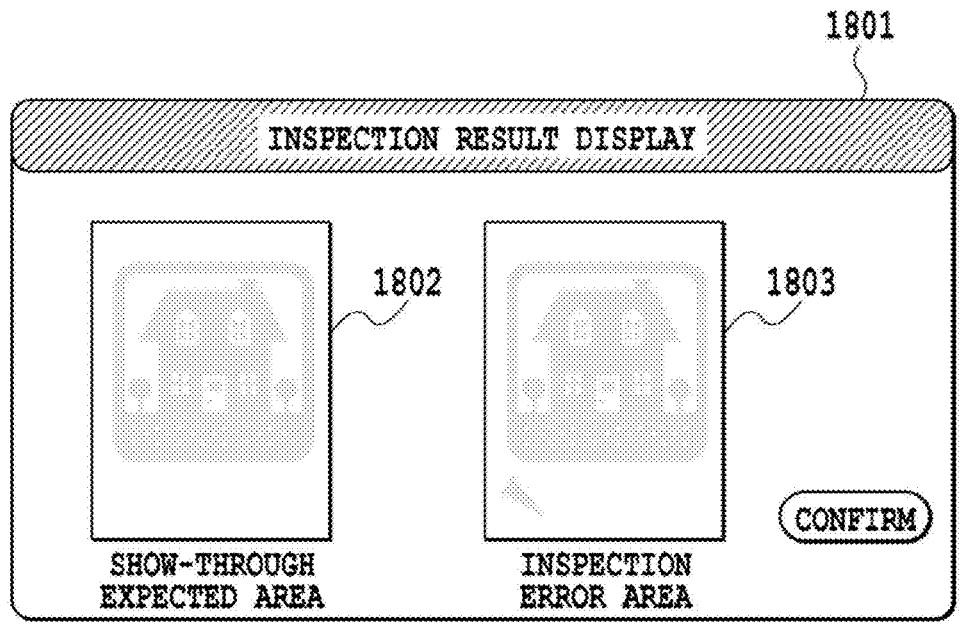
FIG. 18A is an exemplary inspection result display in accordance with the second embodiment.
Figure 18B:
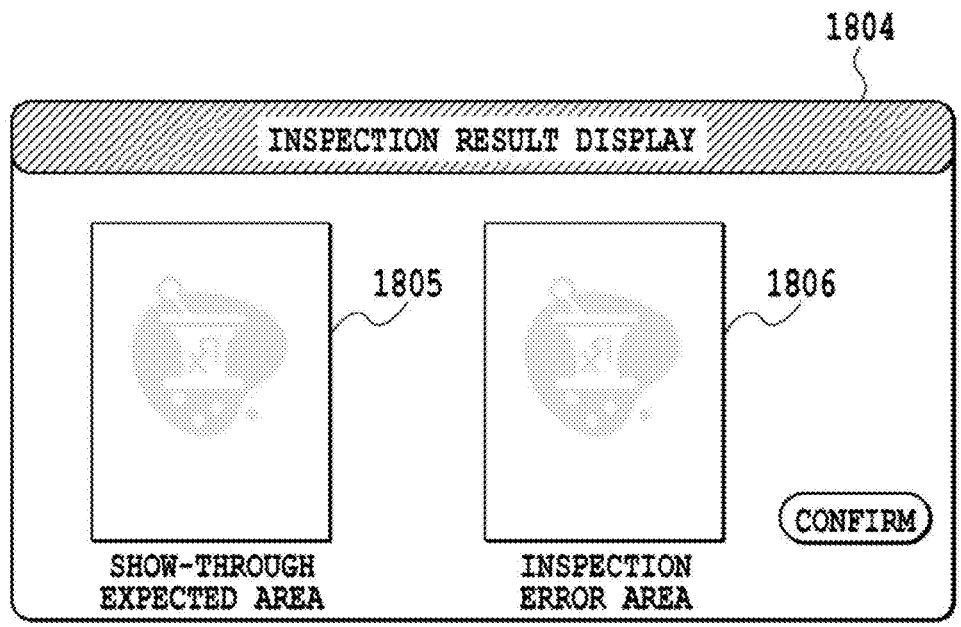
FIG. 18B is an exemplary inspection result display in accordance with the second embodiment.

FIGS. 18A and 18B show alternative embodiments of display on the operation unit 207. FIG. 18A shows an inspection result display menu 1801 indicating a result of the first inspection processing. FIG. 18A shows a show-through expected area 1802 obtained by referring to a density map and an inspection error area (inspection error map) 1803. In response to an NG inspection determination result, a display unit provided for the operation unit 207 may display an area affected by show-through and an inspection error area having an NG inspection determination result to determine whether to perform second inspection processing.

In the example of FIG. 18A, it is obvious that the area affected by show-through and the inspection error area do not match. Thus, the apparatus is controlled to perform subsequent processing based on the NG inspection determination result. In the example of FIG. 18B, it is possible to determine that the area affected by show-through and the inspection error area mostly match. Therefore, the second inspection processing is performed by applying an inspection standard (determination threshold) to the show-through area (inspection error pixels in the inspection error map) to obtain a final determination.

An embodiment has been described of determining whether to perform second inspection processing after displaying pixels in the show-through expected area and pixels in the inspection error area on the operation unit 207. However, the present invention is not limited thereto. The control unit of the inspection apparatus 102 may refer to a percentage of inspection errors and automatically control the second inspection processing. In this configuration, a user of the inspection apparatus 102 does not need to determine whether to perform the second inspection processing, thereby increasing the level of convenience. Furthermore, there may be set a predetermined standard at which the process automatically moves to the second inspection processing. For example, in a form in accordance with the embodiments of display as shown in FIGS. 17A to 17C, the number of inspection error pixels in the show-through area (percentage) is set to be equal to or greater than a value α and the number of inspection error pixels outside the show-through area is set to be equal to or less than a value β, which values can be set in advance by the user via the operation unit 207. In this case, in response to an NG result of the first inspection determination, the inspection apparatus 102 compares a percentage of the generated inspection error pixels with set values α and β to determine whether to automatically move to the second inspection processing.

[Control Process of Two-Step Inspection Processing Determination]

Figure 19:
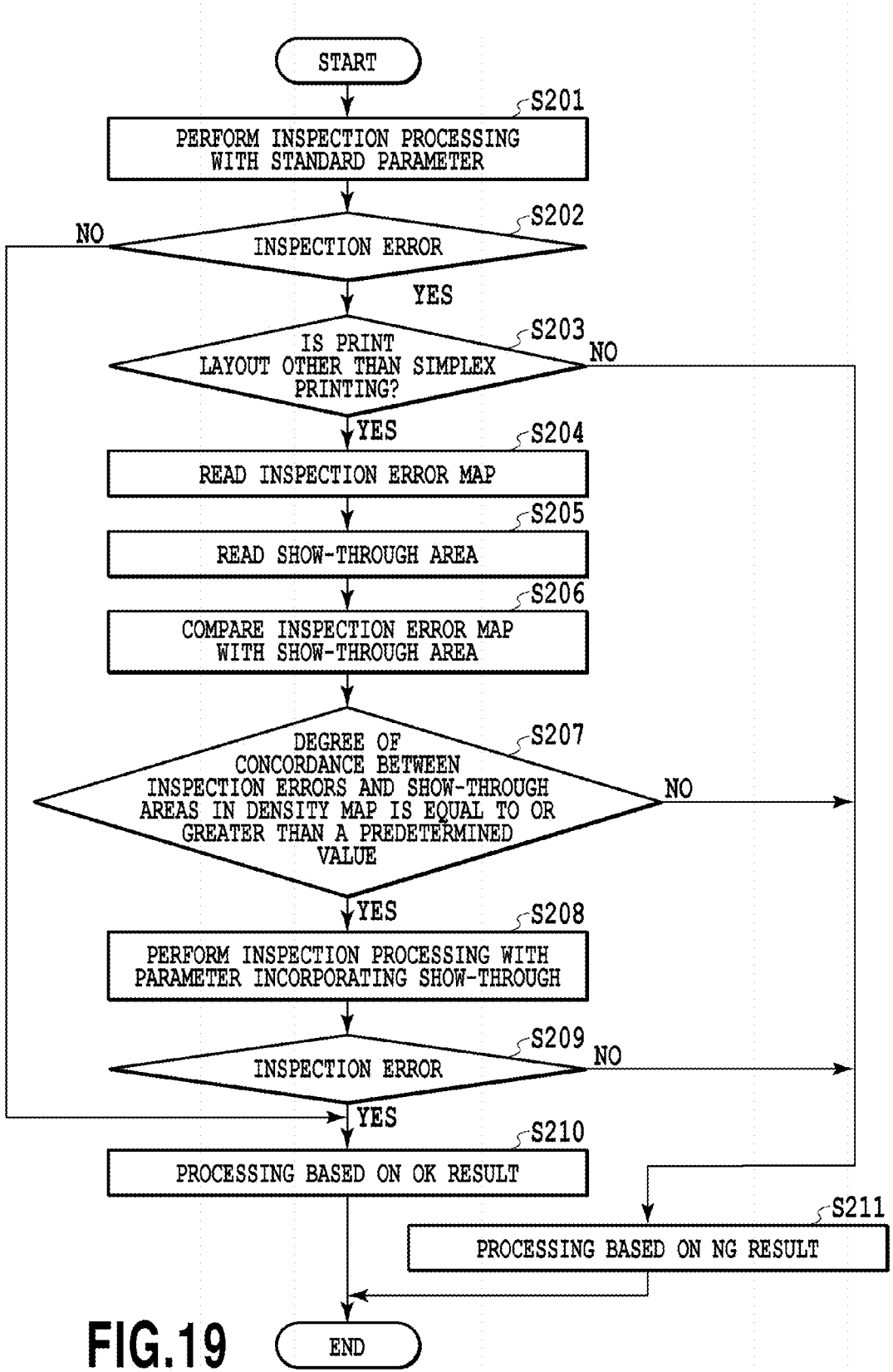
FIG. 19 is a flow chart of inspection control in accordance with the second embodiment.

Referring to other figures, control in accordance with the second embodiment will be described. FIG. 19 is a flow chart of the control in accordance with the second embodiment. Although not shown, the inspection apparatus 102 includes a control unit for controlling the entire processing by the inspection apparatus 102. This control unit controls operation to perform first inspection processing by using a standard parameter. The standard parameter as used herein can be an inspection standard with a precision desired to be applied for inspection by the inspection apparatus 102. That is, the control unit performs inspection processing by using an inspection standard for the inspection apparatus 102 without consideration of a show-through area (step S201).

In a case when no error is determined in the first inspection processing (NO in step S202), the control unit gives an OK inspection determination result to perform subsequent processing based on the OK inspection result (step S210). In a case when an NG inspection determination result is given in the first inspection processing (YES in step S202), the control unit determines whether both sides of the inspected sheet are printed. In a case when the control unit determines that one side of the sheet is printed (NO in step S203), it is determined that the first inspection determination result is not due to the influence of show-through to perform subsequent processing based on the NG inspection result (step S211).

In a case when an NG inspection determination result is given in the first inspection processing and both sides of the sheet are printed (YES in step S203), the control unit starts the control of second inspection processing. In particular, the control unit first reads the inspection error map generated on the basis of the front and reverse sides in the first inspection processing (step S204). That is, as described referring to FIGS. 16A to 16F, based on the image data obtained by reading a printed material having image data on both sides, the control unit generates an inspection error map that specifies a pixel causing an NG inspection result of the printed material (inspection error map generation step).

The control unit then generates data that specifies a show-through area on the basis of the inspection sensor A 404 and on the basis of the inspection sensor B 406 (step S205). It should be noted that since the process of specifying a show-through area is the same as that described in the first embodiment, the detailed description is omitted herein.

Next, as described referring to FIGS. 17A to 17C, the control unit compares the inspection error map with the show-through area data (step S206). In a case when the comparison result in step S206 indicates that a degree of concordance is equal to or greater than a predetermined value between pixels determined to be errors in the inspection error map and pixels in the show-through area, the control unit determines that the NG inspection determination result is due to the influence of show-through (YES in step S207). In this case, the control unit performs second inspection processing (step S208). As described in the first embodiment, the second inspection processing is performed by changing an inspection standard (determination threshold) applied to the show-through area. As described before, in a case when a percentage of the inspection errors caused by a factor other than show-through is large, even when the comparison result in step S206 indicates that a degree of concordance is equal to or greater than a predetermined value, the control unit performs subsequent processing based on the NG inspection result without performing the second inspection processing (No in step S207 and step S211).

That is, in a case when the comparison result in step S206 indicates that a degree of concordance is equal to or greater than a predetermined value between pixels determined to be errors in the inspection error map and pixels in the show-through area, the control unit inspects the printed material again in step S208. In this second inspection, the control unit sets, to a portion corresponding to the pixels determined to be errors in the inspection error map from the printed material having the image data printed thereon, a lower reference value for the second inspection of the printed material as compared to other portions.

In a case of obtaining an NG result in the second inspection determination processing, which is performed by changing an inspection standard (determination threshold) applied to the show-through area, the control unit determines that the printed material includes a defect portion caused by a factor other than the influence of show-through to perform subsequent processing based on the NG inspection result. In a case of obtaining an OK result in the second inspection determination processing, the control unit determines that the first NG inspection determination result was due to the influence of show-through and the printed material does not include a print defect portion, and performs subsequent processing based on the OK inspection result (step S210).

As described above, in the second embodiment, inspection processing is performed several times with a higher inspection standard in the first inspection and a lower inspection standard in the second inspection applied in consideration of an influence of show-through. Performing inspection processing several times can reduce a possibility of having an NG inspection result due to an influence of show-through, without lowering inspection accuracy.

Other Embodiments

Aspects of the present invention can also be realized by a computer of a system or an apparatus (or devices such as a CPU or an MPU) that reads out and executes a program recorded on a memory device to perform the functions of the above-described embodiment(s), and by a method, the steps of which are performed by a computer of a system or an apparatus by, for example, reading out and executing a program recorded on a memory device to perform the functions of the above-described embodiment(s). For this purpose, the program is provided to the computer, for example, via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An apparatus comprising:
   a reading unit configured to read a first side of a printed material having first image data printed on the first side and second image data printed on a second side, the second side being a back side of the first side, in order to obtain image data;
   a density determination unit configured to determine whether a density of the second image data exceeds a predetermined density;
   a comparison unit configured to compare a density of the image data obtained by the reading unit and a density of the first image data, and to produce a comparison result; and
   a determination unit configured, in a case when a density difference between the density of the image data and the density of the first image data exceeds a threshold as the comparison result of the comparison unit, to determine that the printed material includes a defect portion,
   wherein, in a case when the density determination unit determines that the density of the second image data exceeds the predetermined density, the threshold is set to a value at which the printed material is less likely to be determined to include the defect portion than in a case when the density of the second image data is determined not to exceed the predetermined density.

2. The apparatus according to claim 1, wherein the threshold is determined to be a first value in a case when the density of the second image data is determined to exceed the predetermined density and the density of the first image data is a first density, and the threshold is determined to be a second value that is greater than the first value in a case when the density of the second image data is determined to exceed the predetermined density and the density of the first image data is a second density that is lower than the first density.

3. The apparatus according to claim 2, wherein the comparison unit is configured to obtain densities of respective image data for each pixel to compare the density of the image data obtained by the reading unit and the density of the first image data.

4. An apparatus comprising:
   a reading unit configured to read a first side of a printed material having first image data printed on the first side and second image data printed on a second side, the second side being a back side of the first side, in order to obtain image data;
   a specification unit configured to specify pixels having a density difference exceeding a predetermined threshold, by comparing a density difference between image data obtained by the reading unit and the first image data with the predetermined threshold for each pixel; and
   a determination unit configured to determine whether the printed material includes a defect portion by comparing a density difference between the image data obtained by the reading unit and the first image data with a threshold that is greater than the predetermined threshold, with respect to pixels in which a density of the first image data is equal to or lower than a first density among the specified pixels.

5. The apparatus according to claim 4, wherein the determination unit is configured to determine whether the printed material includes a defect portion by comparing a density difference between the image data obtained by the reading unit and the first image data with a threshold that is greater than the predetermined threshold, with respect to pixels in which a density of the first image data is equal to or lower than a first density and a density of the second image data exceeds a second density among the specified pixels.

6. The apparatus according to claim 5, wherein the determination unit is configured:
   to determine whether a degree of concordance is equal to or greater than a threshold between an area including the specified pixels and an area including the pixels in which a density of the first image data is equal to or lower than a first density and a density of the second image data exceeds a second density, to determine, in a case when the degree of concordance is determined to be equal to or greater than the threshold, whether the printed material includes a defect portion by comparing a density difference between the image data obtained by the reading unit and the first image data with a threshold that is greater than the predetermined threshold, and to determine, in a case when the degree of concordance is determined to be lower than the threshold, that the printed material includes a defect portion.

7. A method comprising:

a reading step of reading a first side of a printed material having first image data printed on the first side and second image data printed on a second side, the second side being a back side of the first side, in order to obtain image data;

a density determination step of determining whether a density of the second image data exceeds a predetermined density;

a comparison step of comparing a density of the image data obtained by the reading step and a density of the first image data; and a determination step of determining, in a case when a density difference between the density of the image data and the density of the first image data exceeds a threshold as a comparison result of the comparison step, that the printed material includes a defect portion, wherein, in a case when the density determination step determines that the density of the second image data exceeds the predetermined density, the threshold is set to a value at which the printed material is less likely to be determined to include the defect portion than in a case when the density determination step determines that the density of the second image data does not exceed the predetermined density.

8. The method according to claim 7, wherein the threshold is determined to be a first value in a case when the density of the second image data is determined to exceed the predetermined density and the density of the first image data is a first density, and determined to be a second value that is greater than the first value in a case when the density of the second image data is determined to exceed the predetermined density and the density of the first image data is a second density that is lower than the first density.

9. The method according to claim 8, wherein the comparison step includes obtaining densities of respective image data for each pixel to compare the density of the image data obtained by the reading step and the density of the first image data.

10. A method comprising:

a reading step of reading a first side of a printed material having first image data printed on the first side and second image data printed on a second side, the second side being a back side of the first side, in order to obtain image data;

a specification step of specifying pixels having a density difference exceeding a predetermined threshold, by comparing a density difference between the image data obtained by the reading step and the first image data with the predetermined threshold for each pixel; and a determination step of determining whether the printed material includes a defect portion by comparing a density difference between the image data obtained by the reading step and the first image data with a threshold that is greater than the predetermined threshold, with respect to pixels in which a density of the first image data is equal to or lower than a first density among the specified pixels.

11. The method according to claim 10, wherein the determination step includes determining whether the printed material includes a defect portion by comparing a density difference between the image data obtained by the reading step and the first image data with a threshold that is greater than the predetermined threshold, with respect to pixels in which a density of the first image data is equal to or lower than a first density and a density of the second image data exceeds a second density among the specified pixels.

12. The method according to claim 11, wherein the determination step includes:

determining whether a degree of concordance is equal to or greater than a threshold between an area including the specified pixels and an area including the pixels in which a density of the first image data is equal to or lower than a first density and a density of the second image data exceeds a second density, determining, in a case when the degree of concordance is determined to be equal to or greater than the threshold, whether the printed material includes a defect portion by comparing a density difference between the image data obtained by the reading step and the first image data with a threshold that is greater than the predetermined threshold, and determining, in a case when the degree of concordance is determined to be lower than the threshold, that the printed material includes a defect portion.

13. An inspection apparatus comprising:

a pixel specification unit configured to specify pixels having a density value that is greater than a density value at which show-through may occur from image data to be printed on both sides of paper, the density value at which show-through may occur being determined according to properties of the paper;

an area specification unit configured to specify, according to a result of a comparison between the respective image data to be printed on the respective sides of the paper with respect to the specified pixels, a show-through area in printing results of the respective image data; and a setting unit configured to set a reference value used for inspection of a printed material with respect to a portion specified as the show-through area from areas in the paper having the image data printed thereon, the reference value being a value at which an inspection result that the printed material includes a defect portion, is less likely to be given as compared to other portions.

14. The inspection apparatus according to claim 13, wherein the properties of paper include a basis weight of paper and a surface property of paper, and the density value at which show-through may occur is further determined according to a degree of reflection of light from a light source provided for an image reader for the printing.

15. The inspection apparatus according to claim 13, wherein the pixel specification unit is configured to generate, for the image data, a density map indicating pixels having the density value at which show-through may occur.

16. The inspection apparatus according to claim 15, wherein the pixel specification unit is configured to generate the density map on basis of an object included in the image data.

17. The inspection apparatus according to claim 13, wherein the reference value set by the setting unit is a value set for a density difference between the image data to be printed and the image data obtained by reading the printed material to determine whether the printed material includes the defect portion.

18. A program for causing a computer to function as the inspection apparatus according to claim 13.

19. An inspection apparatus comprising:
an inspection error map generation unit configured to generate an inspection error map that specifies pixels causing an inspection result that a printed material includes a defect portion in image data obtained by reading the printed material having image data printed on both sides;
a pixel specification unit configured to specify pixels having a density value exceeding a density value at which show-through may occur from the respective image data, the density value at which show-through may occur being determined according to properties of paper having the image data printed on both sides;
an area specification unit configured to specify, according to a result of a comparison between the respective image data printed on the respective sides of the paper with respect to the specified pixels, a show-through area in printing results of the respective image data; and
a setting unit configured to set a reference value used for a second inspection of the printed material with respect to a portion corresponding to the pixels specified by the inspection error map from areas of the printed material having the image data printed thereon, the reference value being a loosely-set value as compared to a reference value set with respect to other portions, in a case when a degree of concordance between the pixels specified by the inspection error map and pixels included in the show-through area is equal to or greater than a predetermined value.

20. The inspection apparatus according to claim 19, further comprising an inspection unit configured to inspect the printed material by using a reference value set by the setting unit.

21. An inspection method comprising:
a step of specifying pixels having a density value greater than a density value at which show-through may occur from image data to be printed on both sides of paper, the density value at which show-through may occur being determined according to properties of the paper;
a step of specifying, according to a result of a comparison between the respective image data printed on the respective sides of the paper with respect to the specified pixels, a show-through area in printing results of the respective image data; and
a step of setting a reference value used for inspection of a printed material with respect to a portion specified as the show-through area from areas in the paper having the image data printed thereon, the reference value being a value at which an inspection result that the printed material includes a defect portion, is less likely to be given as compared to other portions.

22. An inspection method comprising:
a step of generating an inspection error map that specifies pixels causing an inspection result that a printed material includes a defect portion, in image data obtained by reading the printed material having the image data printed on both sides;
a step of specifying pixels having a density value that is greater than a density value at which show-through may occur from the respective image data, the density value at which show-through may occur being determined according to properties of paper having the image data printed on both sides;
a step of specifying, according to a result of a comparison between the respective image data printed on the respective sides of the paper with respect to the specified pixels, a show-through area in printing results of the respective image data; and
a step of setting a reference value used for a second inspection of the printed material with respect to a portion corresponding to the pixels specified by the inspection error map from areas of the printed material having the image data printed thereon, the reference value being a loosely-set value as compared to a reference value set with respect to other portions, in a case when a degree of concordance between the pixels specified based on the inspection error map and pixels included in the show-through area is equal to or greater than a predetermined value.

* * * * *